(12) United States Patent
Agrusa et al.

(10) Patent No.: US 7,003,558 B2
(45) Date of Patent: *Feb. 21, 2006

(54) METHOD AND SYSTEM FOR COMMUNICATING INFORMATION AND CONTROLLING EQUIPMENT ACCORDING TO A STANDARD PROTOCOL BETWEEN TWO COMPUTERS

(75) Inventors: Russell L. Agrusa, Westwood, MA (US); Jan Burian, Vejprnice (CZ); Robert A. Braier, Madison, WI (US)

(73) Assignee: Iconics, Inc., Foxborough, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 71 days.

(21) Appl. No.: 09/419,239

(22) Filed: Oct. 15, 1999

(65) Prior Publication Data

US 2004/0024891 A1 Feb. 5, 2004

Related U.S. Application Data

(60) Provisional application No. 60/104,485, filed on Oct. 16, 1998.

(51) Int. Cl.
*G06F 15/173* (2006.01)

(52) U.S. Cl. .................. 709/223; 709/224; 709/228; 709/227; 709/230; 700/9

(58) Field of Classification Search ............... 709/103, 709/203, 229, 230, 231, 235, 238, 314, 220, 709/224, 225, 223; 700/9, 2, 3, 4, 14, 17, 700/19, 20
See application file for complete search history.

(56) References Cited

U.S. PATENT DOCUMENTS

| 4,141,066 A | * | 2/1979 | Keiles .................. 700/81 |
| 5,652,908 A | | 7/1997 | Douglas et al. ......... 395/800 |

(Continued)

FOREIGN PATENT DOCUMENTS

| EP | 0 266 784 A2 | 5/1988 |
| EP | 0 460 308 A1 | 12/1991 |

(Continued)

OTHER PUBLICATIONS

Sep. 11, 1997 "OLE for Process Control Data Access Standard" Version 1.0A, The OPC Foundation.*

(Continued)

*Primary Examiner*—Glenton B. Burgess
*Assistant Examiner*—Kevin Parton
(74) *Attorney, Agent, or Firm*—Testa, Hurwitz & Thibeault, LLP

(57) ABSTRACT

A system for communicating according to a standard communication protocol for process control includes a plurality of interconnected computers. The system includes a module that permits communication of information between computers that communicate with process control equipment. The system also includes a module that permits a primary controlling machine to communicate with computers that communicate with process control equipment, and that permits a secondary controlling machine to take the place of the primary controlling machine when the primary controlling machine is unavailable. The system further includes a module that aggregates requests for information directed to one computer that communicates with a piece of process control equipment, communicates with the computer and obtains the information, and delivers the information to each of the requesters. The standard communication protocol for process control can be OPC, and the communicated information can be one or more process control parameters.

11 Claims, 23 Drawing Sheets

U.S. PATENT DOCUMENTS

| | | | |
|---|---|---|---|
| 5,671,415 A | | 9/1997 | Hossain ..................... 395/701 |
| 5,726,912 A | | 3/1998 | Krall, Jr. et al. ............ 364/550 |
| 5,812,668 A | | 9/1998 | Weber ......................... 380/24 |
| 5,815,657 A | | 9/1998 | Williams et al. ............ 395/186 |
| 5,818,447 A | | 10/1998 | Wolf et al. ................. 345/335 |
| 5,828,674 A | | 10/1998 | Proskauer .................. 371/22.1 |
| 5,828,840 A | | 10/1998 | Cowan et al. ......... 395/200.33 |
| 5,835,914 A | | 11/1998 | Brim .......................... 707/206 |
| 5,850,446 A | | 12/1998 | Berger et al. ................. 380/24 |
| 5,867,153 A | | 2/1999 | Grandcolas et al. ........ 345/326 |
| 5,889,516 A | | 3/1999 | Hickey et al. .............. 345/333 |
| 5,910,895 A | | 6/1999 | Proskauer et al. ..... 364/468.28 |
| 5,938,781 A | | 8/1999 | Proskauer ................... 714/724 |
| 6,032,203 A | * | 2/2000 | Heidhues ..................... 709/230 |
| 6,131,122 A | * | 10/2000 | Sampson ..................... 707/10 |
| 6,141,005 A | | 10/2000 | Hetherington et al. ...... 345/333 |
| 6,151,625 A | * | 11/2000 | Swales et al. .............. 709/218 |
| 6,188,401 B1 | | 2/2001 | Peyer ......................... 345/335 |
| 6,259,448 B1 | | 7/2001 | McNally et al. ............ 345/348 |
| 6,313,851 B1 | | 11/2001 | Matthews, III et al. ..... 345/718 |
| 6,330,005 B1 | | 12/2001 | Tonelli et al. .............. 345/735 |
| 6,341,306 B1 | | 1/2002 | Rosenschein et al. ....... 709/217 |
| 6,349,410 B1 | | 2/2002 | Lortz ......................... 725/110 |
| 6,380,959 B1 | | 4/2002 | Wang et al. ................. 345/853 |
| 6,389,464 B1 | * | 5/2002 | Krishnamurthy et al. ... 709/220 |
| 6,441,834 B1 | | 8/2002 | Agassi et al. ............... 345/764 |
| 6,456,307 B1 | | 9/2002 | Bates et al. ................. 345/838 |
| 6,466,203 B1 | | 10/2002 | Van Ee ....................... 345/173 |
| 6,477,565 B1 | | 11/2002 | Daswani et al. ............ 709/217 |

FOREIGN PATENT DOCUMENTS

| | | |
|---|---|---|
| EP | 0 566 283 A2 | 10/1993 |
| EP | 0 762 273 A1 | 3/1997 |
| EP | 0 778 688 A2 | 6/1997 |
| EP | 0 810 499 A2 | 12/1997 |
| EP | 0 825 506 A2 | 2/1998 |
| WO | WO 97/00475 | 1/1997 |

OTHER PUBLICATIONS

ICONICS DataWorX32, OPC Redundancy & Bridging, http://www.iconics.com/Genesis32/DataworX_99.htm, printed Oct. 15, 1999.

"Welcome to Logo.gif (3167 bytes), OPC–To–The–Core" http://www.iconics.com/index2.htm, printed Oct. 18, 1999.

"Vertical Industry Specifications Supported in Windows DNA", http://www.microsoft.com/Dna/industry/vertical.asp, printed Oct. 18, 1999.

Jurgen Schmoll, "Wird OLE for Process Control (OPC) ein neuer Industriestandard!" Automatisierungstechnische Praxis—ATP, DE, Oldenbourg Verlag. Munchen, vol. 39, No. 5, May 1, 1997, pp. 11–17, XP 000689324 (the whole document).

National Instruments: "Graphical Programming for PC Automation" Instrupedia 97. Your Interactive Encyclopedia For Instrumentation, vol. 2, No. 1, 1997, pp. 6–21 to 6–28, XP–002132205 (the whole document).

Archana Shrotriya: "Using Object Linking And Embedding (Ole) Automation In Labview 4.0" National Instruments, Application Note 081, XP–002132206.

Edward Bassett, Making the OPC Connection, Start Magazine vol. 2 No. 4, Jul./Aug. 1998, downloaded Feb. 24, 1999 from http://www.startmag.com/v2n4opcp002.htm, 3 pages.

Mark Edmond, Efforts Advance to Tie Shop–Floor Automation to Back–Office Systems,Start Magazine, vol. 2 No. 1, Jan./Feb. 1998, downloaded Feb. 24, 1999 from http://www.startmag.com/v2n1opc1.htm, 6 pages.

Mark Edmund, 51 Companies were selected as The Hottest Companies in 1998 after months of deliberation by a panel of start's editors, Start Magazine vol. 2 No. 4, Jul./Aug. 1998, downloaded Feb. 24, 1999 from http://www.startmag.com/v2n4p030.htm#ICONICS, 23 pages.

Steve Robinson and Alex Krasilshchikov, ActiveX Magic: An ActiveX Control and DCOM Sample Using ATL, May 1997, downloaded Mar. 12, 1998 from http://www.microsoft.com/com/overview.htm, 11 pages.

P. Wiedenberg, ActiveX Technology Optimizes Process Visualization, Engineering and Automation, vol. 20, Jan. 1998, pp. 36–37.

Shepard et al., How MFC Does Activex Connections, Dr. Dobbs Journal, vol. 22, Apr. 1997, pp. 109–113.

Press Release, ICONICS GraphWorX32 Awarded Prestigious Control Engineering 1997 Editors' Choice Award, Feb. 27, 1998, downloaded Mar. 12, 1998 from http://www.iconics.com/CE97awrd.htm, 2 pages.

What is OPC?, downloaded Mar. 12, 1998 from http://www.iconics.com/opc/what_opc.htm, 1 page.

OPC ToolWorX, downloaded Mar. 12, 1998 from http://www.iconics.com/opc/toolw2.htm, 3 pages.

OPC Programmers' Connection, History of OPC, downloaded Mar. 12, 1998 from http://www.dspace.dial.pipex.com/town/estate/on50/history.shtml, 2 pages.

National Instruments, OPC—Frequently Asked Questions, downloaded Mar. 12, 1998 from http://www.natinst.com/automation/opc_faq.htm, 2 pages.

Microsoft Corporation, COM Technologies Home Page, downloaded Mar. 12, 1998 from http://www.microsoft.com/com/comintro.htm, 1 page.

Windows NT and 95 OS, OPC, ActiveX, and RAD Tools Shape Course of OI Software, by B. Anger, I & CS Industrial and Process Control Magazine, vol. 69, Nov. 1996, pp. 49–54.

International Search Report, PCT/US99/05534, 7 pages, Jul. 6, 1999.

Office Action for application No. 09/267,204 dated mailed on Jun. 16, 2003.

Office Action for application No. 09/478,775 dated mailed on May 20, 2002.

Final Office Action for application No. 09/478,775 dated mailed on Oct. 24, 2002.

Advisory Action for application No. 09/478,775 dated mailed on Jan. 13, 2003.

Office Action for application No. 09/478,775 dated mailed on Apr. 10, 2003.

Interview Summary for application No. 09/478,775 dated mailed on Jul. 24, 2003.

* cited by examiner

METHOD AND SYSTEM FOR COMMUNICATING INFORMATION AND CONTROLLING EQUIPMENT ACCORDING TO A STANDARD PROTOCOL BETWEEN TWO COMPUTERS

CROSS-REFERENCE TO RELATED APPLICATION

This is based on and claims priority to and the benefit of U.S. Provisional Patent Application Ser. No. 60/104,485, filed Oct. 16, 1998, the entirety of which application is hereby incorporated herein by reference.

TECHNICAL FIELD

The invention relates to communication between computers in a network, and in particular to communication between computers that are communicating according to a communication standard for process control.

BACKGROUND INFORMATION

It is possible to communicate by computer using communication technology such as electronic mail (e-mail). Communication between and among computers using any of a variety of protocols over the Internet, local area networks ("LANs"), and wide area networks ("WANs") also is known. Such communication can be interrupted or severely compromised when an intermediary, such as a server computer, becomes unavailable.

Manufacturing machines and other types of industrial equipment can be interconnected and controlled to form an automated manufacturing system. It is known to hard-wire different types of equipment together to form such a system, using custom cabling. The use of such dedicated custom cabling makes it difficult, time consuming, and expensive to add additional machines or equipment to the system, or to replace machines/equipment with different or improved machines/equipment or with machines/equipment made by different manufacturers. Another solution that has been applied to this problem is the writing of custom computer code to allow the conversion of information or instructions residing on one manufacturer's equipment, such as a Programmable Logic Controller ("PLC"), to be communicated to another PLC made by a different manufacturer.

SUMMARY OF THE INVENTION

The invention relates generally to controlling processes, which can include controlling equipment (such as valves and gauges) in an automated factory or process line, and the control of other processes or activities, including the operation of power plants, water treatment facilities, and heating, air conditioning and ventilation ("HVAC") systems. The invention can be used in activities that involve the interactions of humans with control processes and systems, for example, in nursing homes, in amusement park rides, and even in prisons. The invention can also be used to conduct operations in a discrete manufacturing environment, where data or events result in the generation and use of digital signals.

Some manufacturers of process control equipment also sell or provide a computer (and/or software) that controls the equipment and/or monitors the equipment. Two such manufacturers are Allen-Bradley and Siemens. The invention can be used to connect such controlling computers (e.g., OPC servers, where OPC stands for Object Linking and Embedding for Process Control). For example, an Allen-Bradley OPC server can be made to interoperate with a Siemens OPC server, such that they can share data easily and seamlessly and thereby control/monitor the various equipment connected to the two different servers. The invention also can be used to allow multilevel OPC data redundancy. When there is a primary and one or more secondary or backup OPC servers, the invention allows automatic switching to one of the backup servers if the primary server becomes unavailable. Still another use of the invention is in allowing aggregation of requests directed to a particular piece of process control equipment, and thereby increasing the efficiency of the process by obtaining information once based on those aggregated requests, and then supplying copies of that information to all of the requesters. As an example, in a manufacturing process, multiple pieces of equipment might require the value of a process control parameter such as the rate of production of a certain part at a particular workstation, or the volume of some reagent held in a tank in a chemical process. Rather than burdening the process control equipment that controls the process that yields the parameter of interest with multiple requests for the same data, the information is requested once, and the information obtained is then supplied to each of the requesting computers, allowing the process control equipment to perform more efficiently.

In one aspect, the invention relates to a computer program recorded on a computer-readable medium. The computer program comprises a module that permits the communication of information according to a standard communication protocol for process control between a first computer and a second computer. The first computer is in communication with a first piece of process control equipment. The second computer is in communication with a second piece of process control equipment.

In one embodiment, the standard communication protocol for process control is OLE ("Object Linking and Embedding") for Process Control ("OPC"). The OPC protocol has been defined by the OPC Foundation. OPC is designed for use by programmers in building programs and systems that allow communication in a Distributed Component Object Model ("DCOM") system, such as a network of computers, in which component objects can reside on different computers. Other standardized communication protocols for process control could be used as the communication protocol in other embodiments of the invention. The information that is communicated according to the protocol can be a process control parameter.

In another aspect, the invention relates to a computer program recorded on a computer-readable medium. The computer program comprises a module that permits a primary controlling machine to communicate according to a standard communication protocol for process control with a first computer and a second computer. The module also permits a secondary controlling machine to communicate according to the standard communication protocol for process control with the first and second computers in place of the primary controlling machine. The first and second computers are in communication with first and second pieces of process control equipment, respectively.

In one embodiment, the secondary controlling machine automatically communicates with the first and second computers in place of the primary controlling machine when the primary controlling machine becomes unavailable.

In another aspect, the invention relates to a computer program recorded on a computer-readable medium. The computer program comprises a module that aggregates all requests for information directed to one of a plurality of interconnected computers in a process control environment, such as a factory. The module identifies each of the requesting computers, and delivers (according to the standard communication protocol for process control) the information to each of the requesting computers. At least the computer to which the requests are directed is in communication with at least one piece of process control equipment, and the requests are transmitted according to the standard communication protocol for process control by one or more of the other interconnected computers. After the requests are aggregated, the module communicates with the target computer (using the standard communication protocol for process control) and obtains the information.

In another aspect, the invention relates to a computer program that combines the functionality of the three modules described above.

In another aspect, the invention relates to a networked computerized communication and control system. The system includes a primary controlling machine and a plurality of computers. Each of the computers is connected via the network to the primary controlling machine, and at least some of the computers communicate with at least one of piece of process control equipment. The system also includes three modules that are able to perform the functionality of the three modules described above.

In another aspect, the invention relates to communication between/among and control of equipment connected via a computerized communication and control network. Each of a plurality of computers is connected via the network to a controlling machine. At least some of the computers communicate with at least one piece of process control equipment. The first, second and third modules described above can be operated to communicate information (according to the standard communication protocol for process control) between the computers that are communicating with pieces of process control equipment so as to control a process.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being based upon illustrating the principles of the invention.

DESCRIPTION

Figure 1:
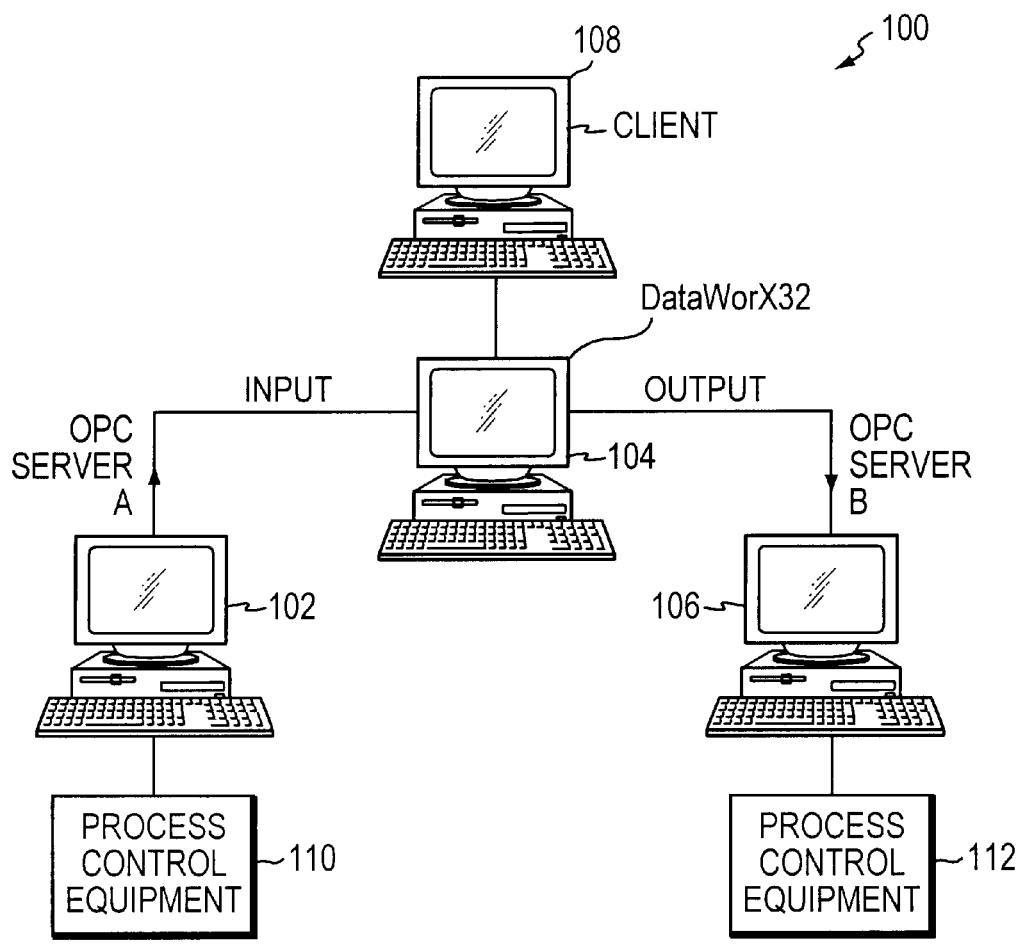
FIG. 1 depicts an embodiment of a server-to-server bridging capability, according to the invention.

This invention relates generally to communication between two or more OPC (i.e., "Object Linking and Embedding" for Process Control) servers. The invention provides the capabilities of creating data bridges between two or more computers, of aggregating requests from one or more computers that are directed to obtaining information from one computer, and of providing redundancy in the control of the communications between the computers. An embodiment of the invention is available from ICONICS, Inc., located at 100 Foxborough Road, Foxborough, Mass. 02035, as a software program and package called DataWorX32 that is designed to operate with a variety of operating systems, including Windows 95, Windows 98, Windows NT 4.0, Windows NT 5.0, Windows 2000 and Windows CE. This software program can be, and is, supplied on a computer-readable medium such as a CD-ROM. A program recorded on a computer-readable medium includes not only the program on a CD-ROM but also the program recorded on other computer-readable media such as floppy disks, hard drives, magnetic tape, other storage media such as RAM, ROMs, PROMs, EPROMs and the like, and any other physical storage medium that may be used to permanently record a program, as well as a copy of the program that may be downloaded or transferred from the active memory of one computer to a second computer. While DataWorX32 is software that is designed to execute in general purpose computers, its functionality could be achieved in specialized hardware or in another combination of hardware and software. The invention will be described with reference to the functionality provided by DataWorX32.

The embodiments and examples that are used to explain the features of the invention are a few of many embodiments and examples that can be given. It is common in the software industry to periodically upgrade software. The software "look and feel" may change over time, which is often done to improve the ease of use of the program, and to make its features more readily accessible to less experienced computer users. For example, some users may be comfortable using menus and other text based controls and entering information by typing, while other users may prefer to use a graphical user interface that includes icons and a tool bar and entering information by pointing with a mouse and clicking a mouse button to obtain the same functionality.

Without the capabilities provided by the invention, a computer program that accesses input and output signals may obtain information, but this information will in general be available only in a single application. With the capabilities provided by the invention, information that is obtained by one application residing on one computer can be made available both to other applications on that computer and to other computers in the network, as an OPC data point that is available to the entire network. This is true whether the other computers are made by the same manufacturer or not, whether the other computers have the same kind of CPU or not, and whether the other computers are running the same operating system or not. In the present invention, a Register is a datum, or its location in memory somewhere in the system. If the Register is defined with no input and no output, it is simply a storage register for a global variable with the ability to be read on demand, and written on demand by any computer in the network. An Alias is a placeholder, or a variable whose name can be substituted at a later time. An Alias is used to allow redirection of the reading or writing of information to any location within the network. A Tag is a pointer to a Register, or to a Register on a particular computer or server in the network.

Referring to FIG. 1, in connection with server-to-server data bridging functionality according to the invention, a plurality of computers 102, 104, 106, 108 are interconnected. The computers 102, 104, 106, 108 can be on a computer network 100, and they can communicate over the network 100. The computers 102, 104, 106, 108 can be personal computers or workstations, or generally any other type of computing device such as minicomputers, mainframe computers, embedded computers, or other general purpose computers. In the embodiment shown, the computers have monitors and keyboards, but it should be understood that the computers could have additional or different input and output devices, such as keypads, touch screens, printers, plotters, scanners, modems, and the like, or they can have fewer input and output devices attached, as may be appropriate for a process control system. Each of the computers 102, 104, 106, 108 can run any of a variety of operating systems, such as the Windows systems mentioned above, or systems such as Unix or Linux, and each generally includes all of the basic internal components of a general purpose computer such as a microprocessor, one or more buses, one or more controllers, memory (such as RAM and ROM of any of many conventional types), input and output devices, recording systems such as hard disks, floppy disks or magnetic tape, and the like. One computer 102 is identified as "OPC Server A." This computer 102 also has a connection to a first piece of process control equipment 110, to which it can send instructions and from which it can obtain information. The computer 102 and the first piece of process control equipment 110 can communicate by the exchange of electrical signals that correspond to instructions defined by the manufacturer of the process control equipment 110. In some cases these instructions are proprietary, and in some cases manufacturers have agreed to some standard set of instructions. An example of a first piece of process control equipment can be a sensing device that counts or examines a first type of part (such as a wheel) that passes through a workstation. Another example of the process control equipment is a mass flow controller that both measures and controls the flow of a fluid in a chemical process. Another computer 106 is identified as "OPC Server B." This other computer 106 has a connection to a second piece of process control equipment 112, to which it can send instructions and from which it can obtain information. The computer 106 and the second piece of process control equipment 112 can also exchange instructions and information as electrical signals. An example of a second piece of process control equipment can be a sensing device that counts a second type of part (such as a chassis to which four wheels are attached). Another example of the process control equipment is a power controller that controls the temperature of a chemical reactor. The second controller can request information from the first in order to maintain its process control parameters at the levels needed to keep the process running correctly.

In general, at the present time, direct exchanges of instructions and information are not possible between process control equipment made by different manufacturers. In fact, in some cases, the exchange of instructions and information may not be possible even between equipment made by the same manufacturer. In the present embodiment, if information created at the first process control equipment 110 needs to be communicated to the second piece of process control equipment 112, computer 102 can obtain the information from the first piece of process control equipment 110 and can transmit that information via the OPC communication protocol to another computer 104 that is in the network, and that is running the appropriate software according to the invention. A commercial embodiment of the software is known as DataWorx32, as indicated above. The computer 104 can then transmit the received information, using the OPC communication protocol, from itself to the computer 106 that communicates with the second piece of process control equipment 112. Finally the computer 106 can communicate the information to the second piece of process control equipment 112, using either a proprietary communication protocol or a standard communication protocol. Additional computers, such as the computer 108, that is a "client" that is connected to the network, but that is not involved in the specific communication under discussion, may be part of the network, and may at other times be involved in other communications according to the invention.

For the communication just described, the computer 104 upon which the DataWorX32 program is operating views as input the data transmitted to it by the computer 102, and views as output the information it send to the computer 106. The computers 102, 104, 106, 108 can be made by different manufacturers, can be of different types, and can operate under different operating systems, so long as they all communicate according to a standard communication protocol for process control, which in this embodiment is OPC. In order for a computer to communicate under the OPC protocol, it must have an OPC-compliant interface available in its operating system. Under the Windows operating systems, for example, an OPC-compliant Dynamic Link Library ("DLL") file is sufficient to communicate in an OPC system.

In an equivalent manner, data that the second piece of process control equipment 112 requires about the first piece of process control equipment 110 can be provided to the process control equipment 112. To accomplish this communication, the user sets up DataWorX32 to take information out of 110 (on a polling basis, e.g., every 50 ms) and then to send it to 112. The information is supplied when it represents a significant change in the parameter of interest. A request can be handled between the piece of process control equipment 112 and the computer 106 in the proprietary language of the equipment 112, and can signal, for example, that an error condition has occurred. Such a request will traverse the computer network via computers 106, 104 and 102, once again in the format defined by the standard communication protocol for process control. At the other end, the request can be handled between the piece of process control equipment 110 and the computer 102 in the proprietary language of the equipment 110. The information will flow along the same path, but in the opposite direction. In another embodiment, there can be multiple instances of the DataWorX32 program each running on a different computer.

The information that is transferred between a piece of process control equipment and a computer, or between two computers, may be anything that can be represented by electrical signals, and may include process control parameters as a subset. In general, a process control parameter is a datum (e.g., time, date, temperature, pressure, volume, mass, units of measure, rate of change, measured or computed quantity, alphanumeric string, symbol, etc.), a status of equipment, a status of a process, an identifier of equipment, an identifier of a process, an identifier of a processing batch, a mathematical or logical relationship, and the like.

Figure 2A:
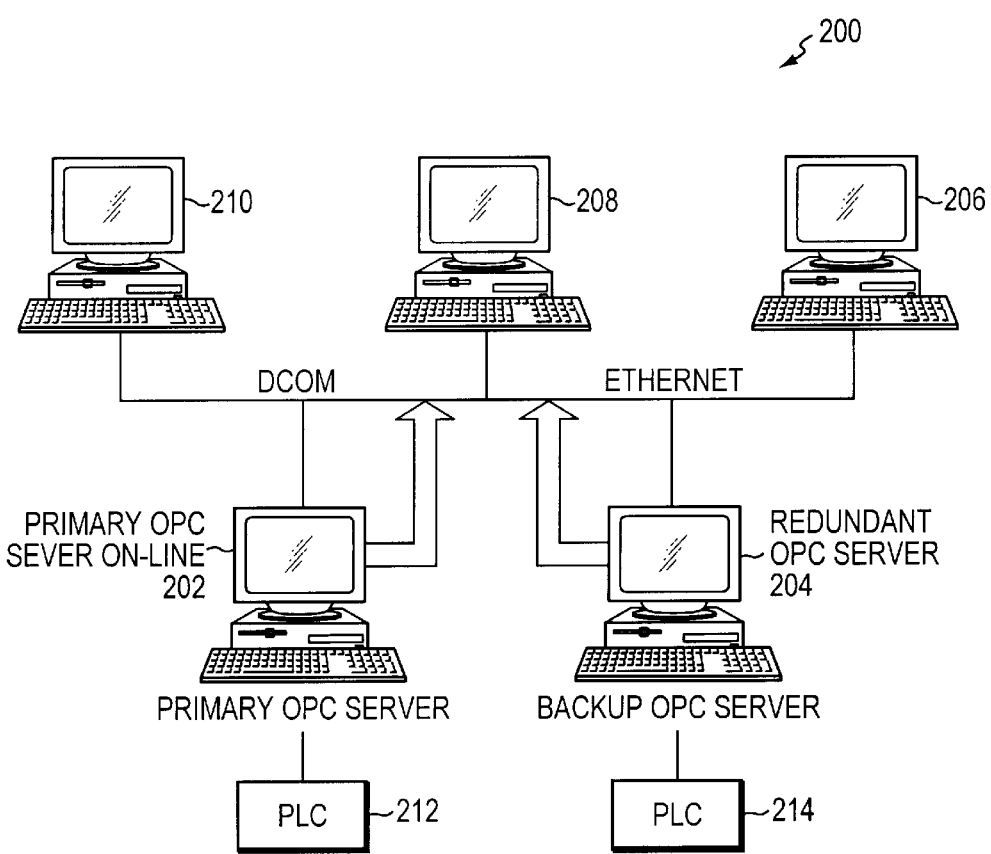
FIG. 2A depicts an embodiment of a system having the redundancy capability, according to the invention, with the primary controlling machine, or primary OPC server, shown online.

FIG. 2A depicts an embodiment of the redundancy capability according to the invention. In FIG. 2A a primary controlling machine, or primary OPC server 202, is online. In this embodiment, primary controlling machine 202 has a communication link to a programmable logic controller ("PLC") 212 that controls the steps of a process in a piece of process equipment (not shown). The primary controlling machine 202 can be one of the computers in the network that perform process control functions, in addition to its operation as the primary controlling machine 202 of the system. The primary controlling machine 202 can communicate with the PLC 212 in either or both of the proprietary language of the PLC 212 or in a standard communication protocol for process control if the PLC 212 is so equipped. In this embodiment, the primary controlling machine 202 is additionally in communication with a plurality of computers 206, 208 and 210. Each of the computers 206, 208 and 210 is capable of controlling one or more pieces of process control equipment (not shown) in a manner like that of computers 102 and 106 of FIG. 1. The computers 206, 208 and 210 are connected by a communications network, and can communicate using a standard communication protocol for process control. In this embodiment, the DataWorX32 program is operating on one of the computers in the network and monitors the activity of the primary controlling machine 202.

In the present embodiment, a redundant OPC server, secondary controlling machine, or the secondary OPC server 204 is present. This redundant secondary controlling machine 204 has connections that duplicate those of the primary controlling machine 202. In this instance, since primary controlling machine 202 has connections to a PLC 212 that controls some portion of a process, there is provided a redundant PLC 214 that has redundant connections to the portion of the process that PLC 212 controls. If primary controlling machine 202 becomes unavailable, as for example due to an internal malfunction, a communication link failure, or the like that degrades the ability of primary controlling machine 202 to perform its duties, secondary controlling machine 204 will have access to all of the facilities that are needed to take the place of primary controlling machine 202, at both the overall system control level and at the level of an individual computer that controls one or more process variables or steps, for example, controlling a PLC needed to run the process control functions that primary controlling machine 202 is intended to perform. The DataWorX32 program that embodies the present invention can be configured to cause secondary controlling machine 204 to take over the functions of primary controlling machine 202 upon the unavailability of primary controlling machine 202.

Figure 2B:
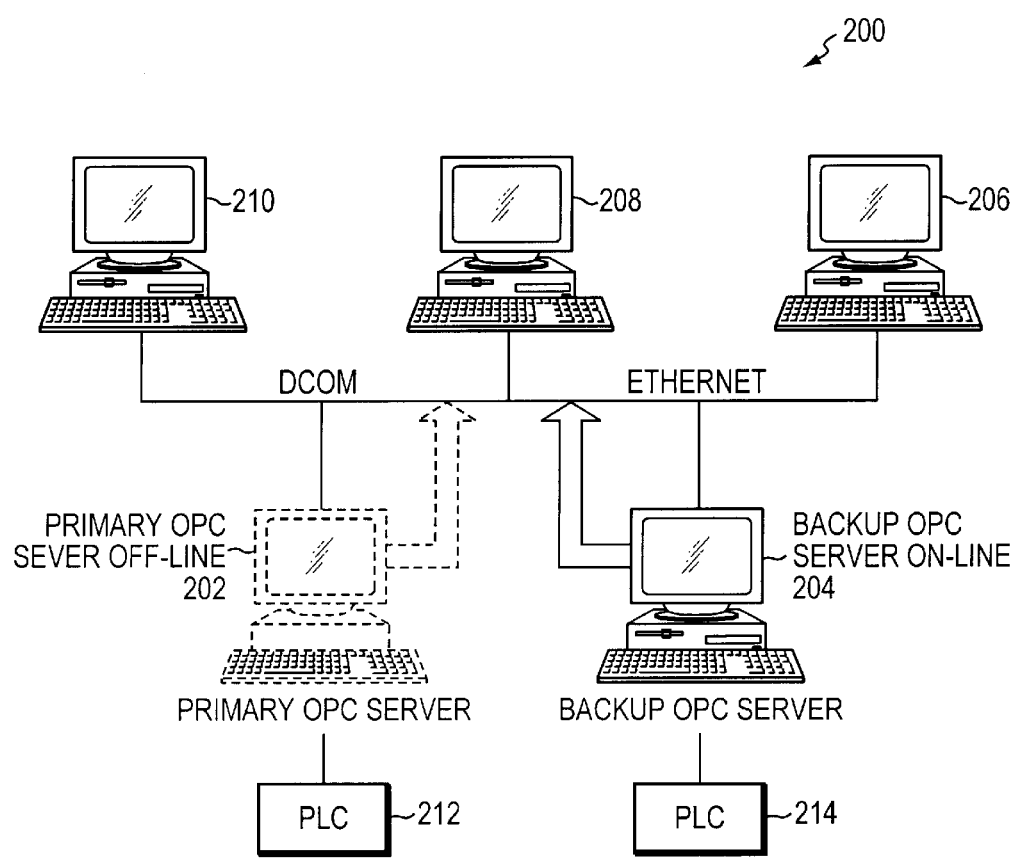
FIG. 2B depicts an embodiment of the system of FIG. 2A, with the primary controlling machine shown offline.

FIG. 2B further depicts an embodiment of the redundancy capability according to the invention. In FIG. 2B, the primary controlling machine 202, or primary OPC server, is offline. The primary controlling machine 202 can be offline for any one of a variety of reasons, such as being deliberately taken out of service for maintenance, or being unavailable because of a malfunction. In the situation where primary controlling machine 202 is unavailable, the invention as embodied in the DataWorX32 program can automatically pass control of the communication between the computers 206, 208 and 210 themselves as well as communication between any of the computers 206, 208 and 210 and a controller to secondary controlling machine 204. The secondary controlling machine 204 takes over all of the functions and capabilities that the primary controlling machine 202 was carrying out before it became unavailable. As described above, in the embodiment shown secondary controlling machine 204 is connected to a PLC 214 that takes the place of the PLC 212 that the primary controlling machine 202 uses to control a process. The replacement of primary controlling machine 202 with secondary controlling machine 204 occurs automatically and transparently as viewed by any of the computers 206, 208 and 210.

While only one secondary controlling machine 204 is depicted in FIGS. 2A and 2B, the present invention provides for a multiple number of secondary controlling machines to be identified, with control passing to each such secondary controlling machine according to a sequence that is configured by an operator. That is, if the system includes three secondary controlling machines, which will be denoted secondary controlling machines A, B and C for discussion, an operator can assign a priority order, such as machine B first, machine C second, and machine A third. In the event that the primary controlling machine 202 of this configuration becomes unavailable, the system will first look to secondary controlling machine B to take the place of the primary controlling machine 202, and then look to secondary controlling machine C to take the place of the primary controlling machine 202 only if secondary controlling machine B is unavailable. In such a configuration, secondary controlling machine A would replace primary controlling machine 202 only if both machines B and C were unavailable.

Figure 3:
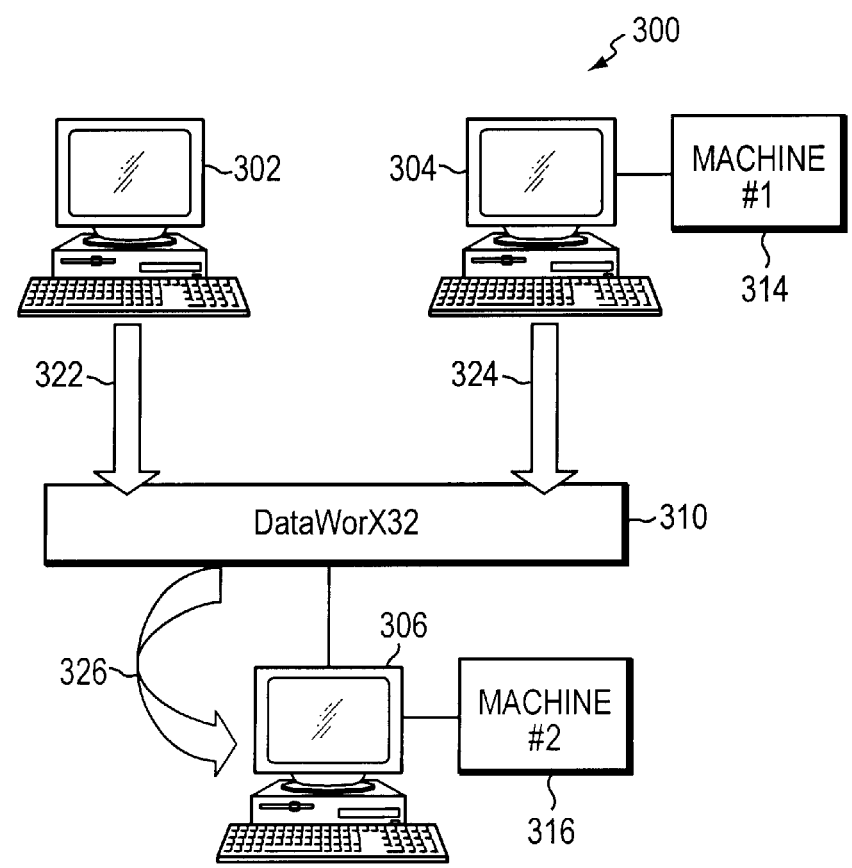
FIG. 3 depicts an example of a system having aggregation capability, according to the invention.

FIG. 3 depicts an example of the aggregation capability according to the invention. FIG. 3 shows a network 300 that comprises three computers 302, 304 and 306. For the purpose of explanation of the aggregation capability of according to the invention, it is irrelevant whether any of computers 302, 304 or 306 is a primary controlling machine. It is also unimportant where in the network there is a computer upon which the DataWorX32 program that embodies a part of the invention is operating. For the purposes of discussion, the DataWorX32 program is depicted as operating within the network, as shown in box 310. The computer 304 is connected to a process machine 314, labeled machine #1. The computer 306 is connected to another process machine 316, labeled machine #2. Depending on what it does, machine #2 can generate one or more process control parameters, such as the number of units of product that it processes, the amount of material that flows through it, a temperature, a pressure, a time, or the like. If the value of some process control parameter is needed by computer 304, for example to control or to operate the machine 314 that it controls, and if the same process control parameter is needed by the computer 302 for its operation, for example to control the inventory or work-in-process, it is possible that both computer 302 and computer 304 will request the same information from computer 306.

In FIG. 3, a request by computer 302 is shown as the arrow 322 connecting computer 302 and the DataWorX32 program, and a request by computer 304 is shown as the arrow 324 connecting computer 304 and the DataWorX32 program. In the circumstance where many requests for the same information are sent to a computer at different times, the overhead that the computer experiences in responding to the multiple requests for the same information can be costly. By using the system and the software that embody the invention, this overhead is rendered unnecessary. According to the present invention, the DataWorX32 program aggregates the requests from the computers 302 and 304 and makes a single request of computer 306 for the desired information. This single request is shown by the arrow 326. Computer 306 responds once with the requested information, which commonly will be transmitted in the opposite direction along the path that the request followed. The program identifies which of the computers in the network have requested the information, for example by maintaining a list of the requests as they are received, and transmits to each of the requesting computers a copy of the information that it obtained from the computer 306. While this embodiment shows only two requests, one from each of two computers, it can be understood that there can be multiple requests from numerous computers that aggregate to a single request for a specific datum from one computer, which datum is then disseminated to all of the requesting computers. For example, in a process that involves fluids in tanks, there may be multiple computers that request a fluid level from one computer that communicates with a holding tank and its process controls that operate the valving system and measure the fluid depth. In such a system, DataWorX32 may act as a "middle-man" between the requesting computers and the one computer that communicates with the holding tank process controls. DataWorX32 may obtain from the one computer the desired value of fluid depth, and can then send copies of the information to each computer that requested it, thereby reducing the overhead on the computer that communicates with the tank and its process control equipment.

FIGS. 1–3 and the preceding text present a description of the features of the invention. FIGS. 4–22 show, and the following text describes, the operation of an embodiment of the invention (namely, the software embodiment known as DataWorX32) in greater detail.

Figure 4:
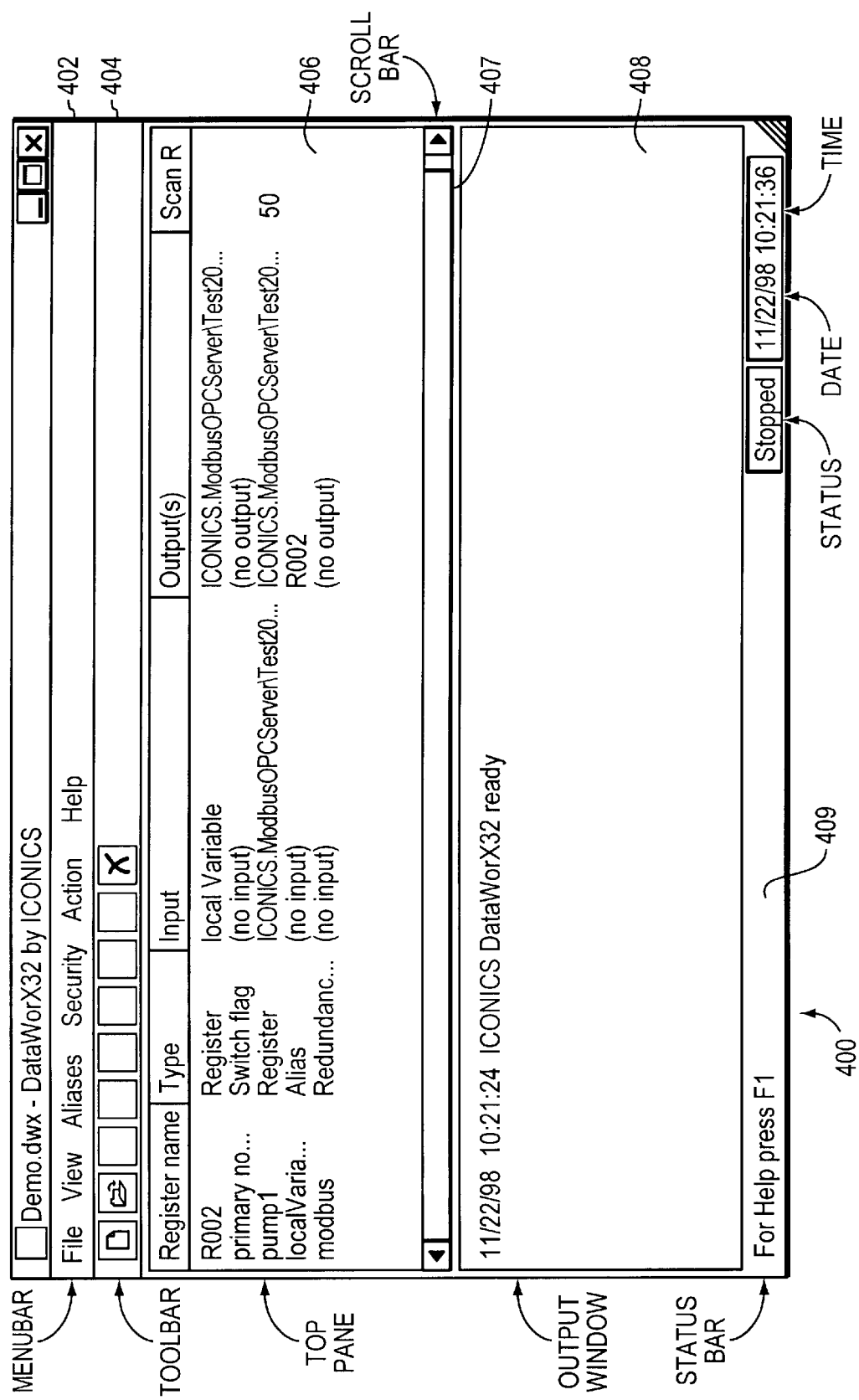
FIG. 4 depicts an embodiment of a first view of a user screen according to the invention.
Figure 12:
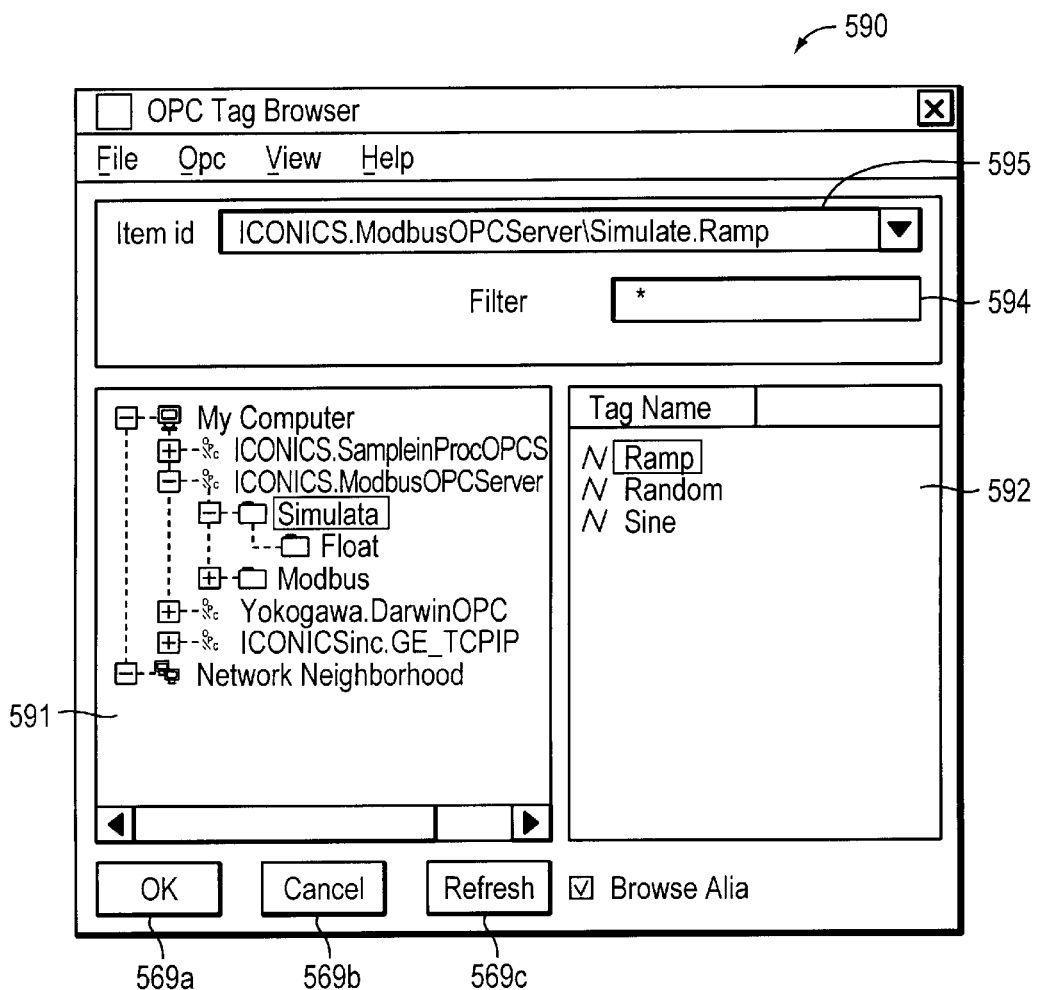
FIG. 12 depicts an embodiment of the present invention, in which a list of tags may be examined.

FIG. 4 depicts an embodiment of a first view of a user screen according to the invention. A user screen shows a user a status of some aspect of a program, one or more options that might be chosen, or otherwise informs the user of events or actions that have occurred or that may be selected. In the DataWorX32 user screen 400 depicted, the user has an overview of the status of a program, DataWorX32, and of the actions that the user may take. At the top of the DataWorX32 user screen 400 is a menubar 402 that provides a text-based control system for user actions. Immediately below the menubar 402 is a toolbar 404, that provides a graphical user interface that includes equivalent controls to those found in the menubar 402. The user can also activate many of the dialog boxes that are described below by clicking the right button of a mouse pointing device when an item of interest is highlighted. For example, highlighting a Tag and clicking on the right mouse button activates the OPC Tag Browser, which is discussed below and which is depicted in FIG. 12.

The remainder of the DataWorX32 user screen 400 is split into two windows, a top pane 406 and an output window 408. The top pane 406 can display information about registers, aliases, current values, and statistics, as will be explained below. At the bottom of the top pane 406 is a scroll bar 407 that can be employed to observe information that extends laterally across the top pane 406. The output window 408 displays the status of the program DataWorX32. At the bottom of the output window 408 is a status bar 409 that enunciates the status of the DataWorX32 program (here, it is stopped), and the date and the time for the convenience of the user. The toolbar 404, the output window 408 and the status bar 409 each can be toggled to appear or to be hidden from view.

Figure 5:
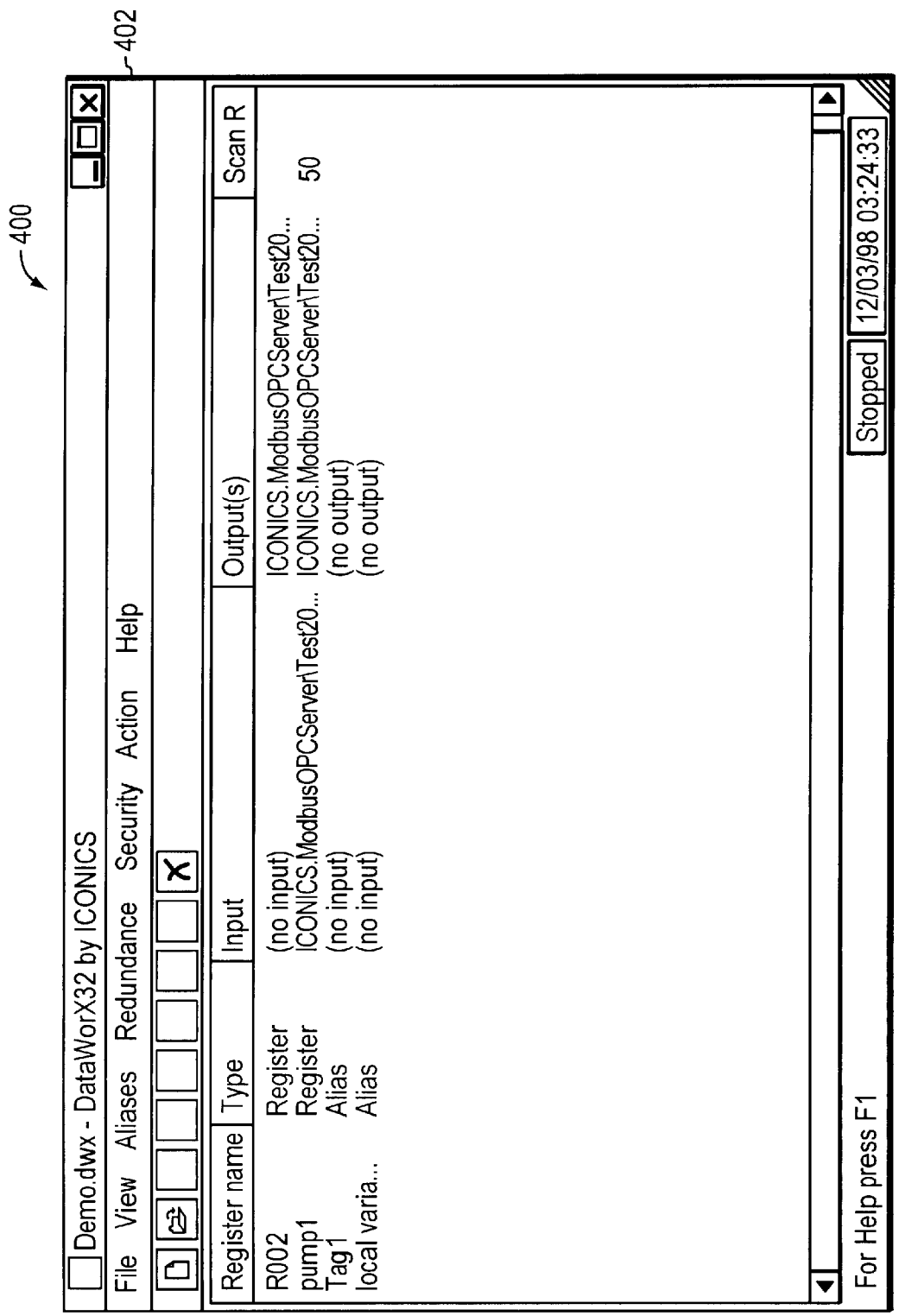
FIG. 5 depicts an embodiment of another view of a user screen according to the invention.

FIG. 5 depicts an embodiment of another view of a user screen according to the invention. In FIG. 5, the DataWorX32 user screen 400 is shown with the output window 408 hidden. In FIG. 5, the All Registers item of the heading Registers on the menubar 402 has been selected. Registers are used to define variables that can then be made available to all OPC clients. A register can correspond to an OPC data point, which may or may not be a global variable. A register may be given values via OPC, by the use of mathematical or logical expressions and constants, or by an application program. The DataWorX32 user screen 400 displays a list of registers with information about the register name, the type of register that the name represents, what inputs if any provide information to the register, what outputs the register supplies information to, and a scan rate in milliseconds for each register that is set for scanning. The type of register is either a register or a status flag that declares a primary or secondary status to a controlling machine. The inputs and outputs are the names of registers or OPC tags that are connected to the register in question as inputs or outputs. A scan rate can only be defined for a register that has an OPC tag connected to its input, and the rate is the repeat period in milliseconds that the input of the register is polled.

Figure 6:
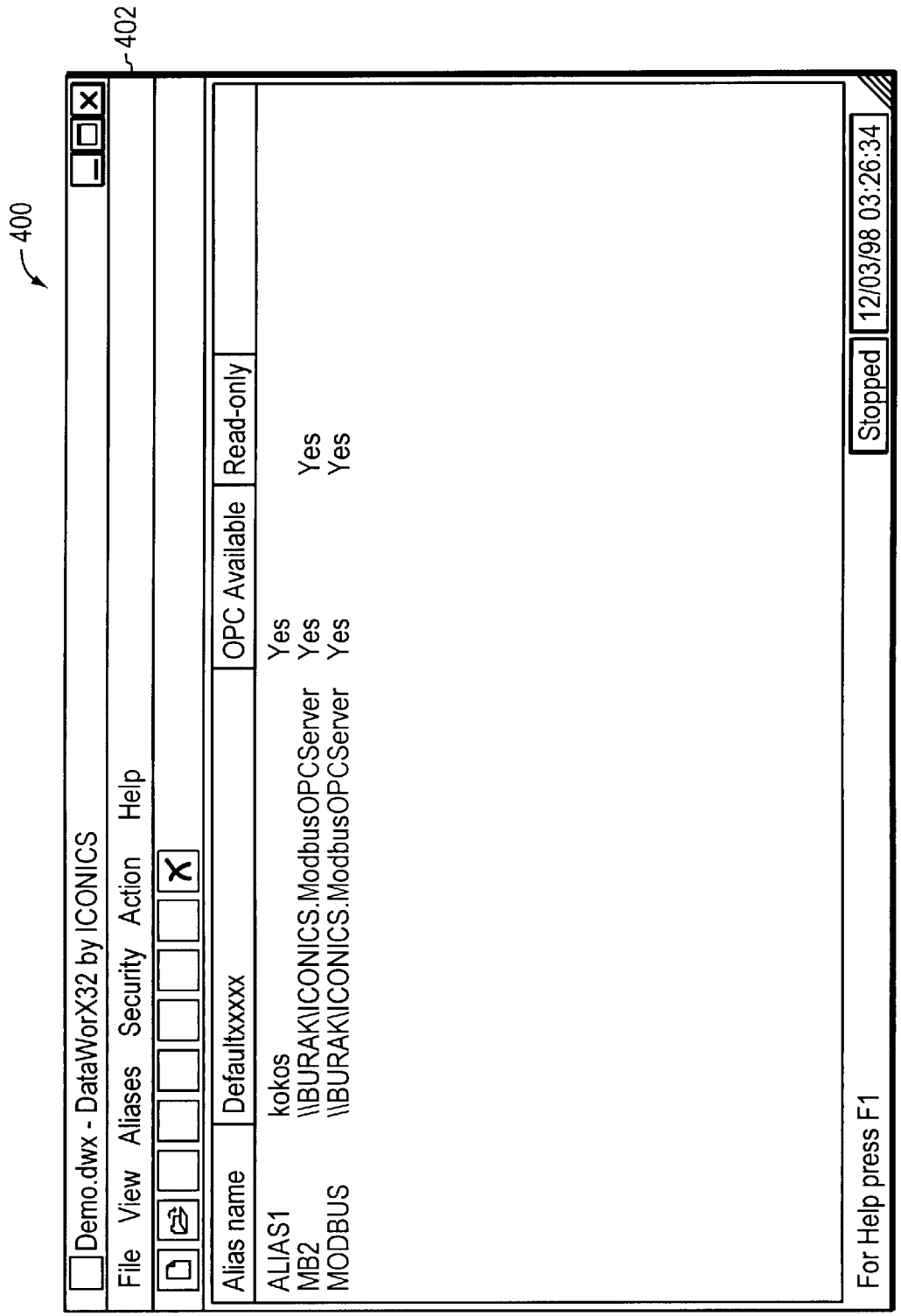
FIG. 6 depicts an embodiment of another view of a user screen according to the invention.

FIG. 6 depicts an embodiment of another view of a user screen according to the invention. In FIG. 6 the Aliases item of the heading View of the menubar 402 has been selected. In FIG. 6 DataWorX32 user screen 400 is displaying a list of aliases. Aliases can be considered as shorthand for a register or for a value, and can be used as variables in expressions. An alias can be thought of as a "placeholder" or "indirect addresse" for a tag, a register, a value, or a variable. An alias is expanded or "resolved" into a string known as an "alias value" when it is used. An alias must first be defined before it can be requested by an item that contains it. Simply reassigning the alias to a different register or value can change an expression that contains an alias. By the use of an alias, it is possible to redirect or reassign a data transmission to or from any location within the network. Multiple aliases simultaneously can relate to the same register or value, but a single alias can only relate to one register or value at any time. As FIG. 6 depicts, an alias list includes an alias name, a default value to which the alias will initially be set, whether the alias can be accessed by and is available to OPC compliant devices, and whether the alias is read-only or may also be written to, thereby changing its value.

Figure 7:
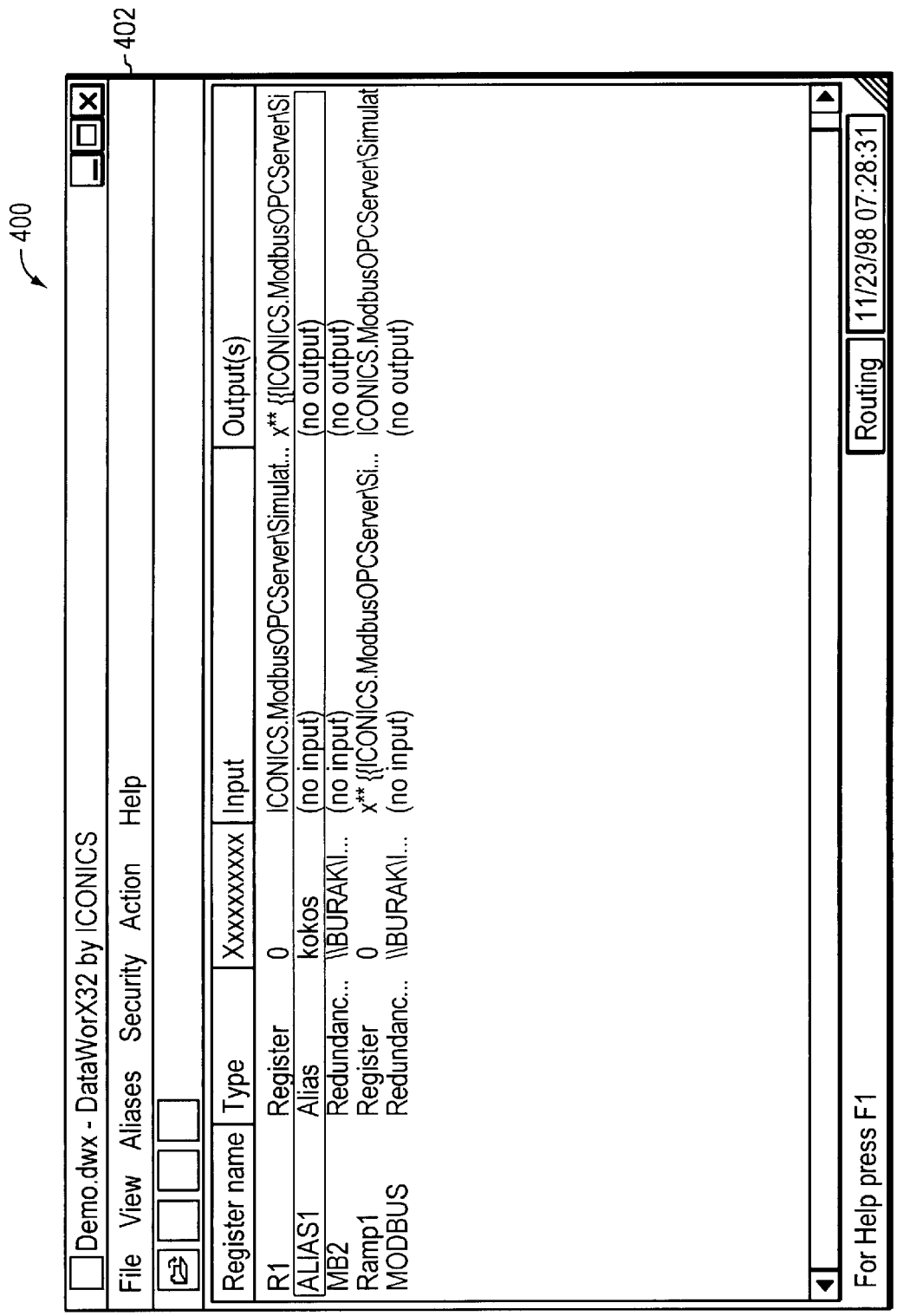
FIG. 7 depicts an embodiment of another view of a user screen according to the invention.

FIG. 7 depicts an embodiment of yet another view of a user screen according to the invention. In FIG. 7, the Monitor item under the heading View on the menubar 402 in DataWorX32 user screen 400 has been selected. In FIG. 7, there is shown a list of the current values of three types of variables, Registers, Aliases, and Controlling Machines. For example, a register named R1 has a current value of zero, and has an input and at least one output that is expressed as an equation wherein a variable x is given a value based on an OPC tag. There is also shown an alias named ALIAS1 that takes the current value of an expression kokos, which is a register or an expression. ALIAS 1 has no inputs or outputs. A Controlling Machine named MB2 is depicted as having a type given as a Redundant server whose value is expressed by a location in the system, and which has no input and no output. A register named Ramp 1 has a current value of zero, an input given by an equation wherein a variable x is given a value based on an OPC tag. Ramp 1 has at least one output, also given by an OPC tag. Lastly, another redundant Controlling Machine is enumerated, by the name of MODBUS, and which has no inputs or outputs.

Figure 8:
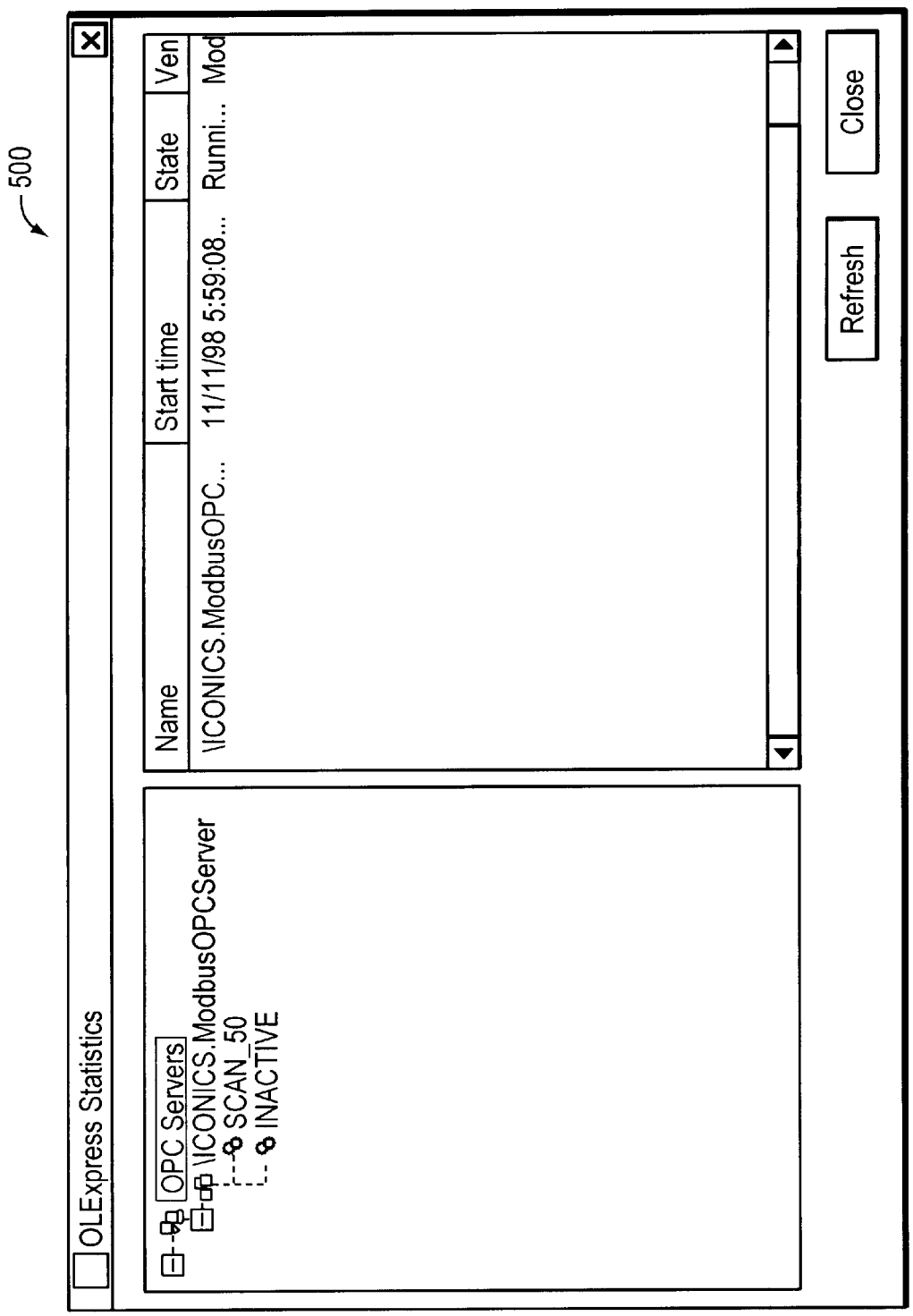
FIG. 8 depicts an embodiment of a view of a statistics window according to the invention.

FIG. 8 depicts an embodiment of a view of a statistics window according to the invention. In FIG. 8, the item Statistics that appears under the heading View of menubar 402 of DataWorX32 user screen 400 has been selected. OLExpress Statistics screen 500 is shown in FIG. 8, wherein a left pane lists a tree structure that contains the listings of all the OPC servers that the system recognizes, starting from a root directory of OPC servers, and progressing to a subdirectory named ICONICS.ModbusOPCServer that contains two listings, SCAN_50 and INACTIVE. In the right pane, the contents of the root directory, which is the entry that is highlighted in the left pane, is displayed. The right pane shows the name of the entry, the date and time that it started, its status (i.e., running or stopped), the Vendor, and the version.

Figure 9:
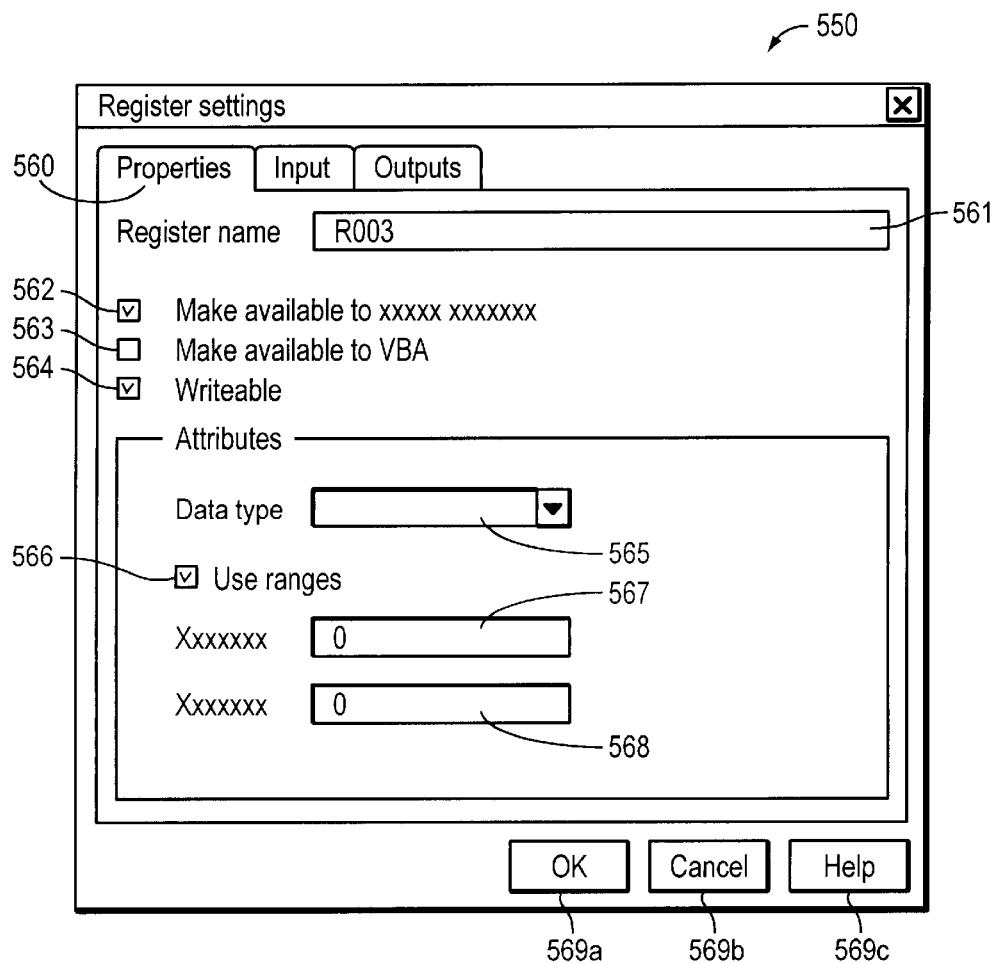
FIG. 9 depicts an example of the configuration of a data bridging application according to the invention, in which properties of a register are defined.

FIG. 9 depicts an example of the configuration of a data bridging application according to the invention, in which the properties of a register are defined. FIG. 9 shows an interactive display 550 that appears upon selection of the Add item of the heading Register of menubar 402 of DataWorX32 user screen 400. In FIG. 9, the Properties tab 560 has been selected. The user can then enter an alphanumeric expression as the Register name in box 561. The user can elect to check the box 562 labeled "Make available to OPC clients" which if check will make the register named available to OPC clients. Checking box 563 will make the register available to Visual Basic for Applications ("VBA") Applications. VBA is a product of the Microsoft Corporation., so that it would be susceptible to editing in a VBA Editor. Checking box 564 will make the register writeable while not checking box 564 will make the register read-only. Entering an expression in the box 565 will allow the register to receive data of a specified type from an input. The acceptable types of data include Float, Double, Boolean, Byte, Word, Dword, Character, Short, Long and String, all of which are well known in the computer programming art, and all of which are available as a dropdown list activated by using a pointing device to activate the down arrowhead button at the right of box 565. Checking box 566 allows the use of manual range selection by entry of values in boxes 567 and 568 to denote low and high ranges, respectively.

Once the user has completed entering information that is correct, the entry can be completed by activating the button 569a labeled OK. Alternatively, the user can remove all the entries by activating the button 569b labeled Cancel, and can then re-enter information. Alternatively, the user can edit any individual entry at any time. If the user is not sure what to do, or what an entry represents, the user can activate the button 569c labeled Help, and a dialog box of on-line information will appear.

Figure 10:
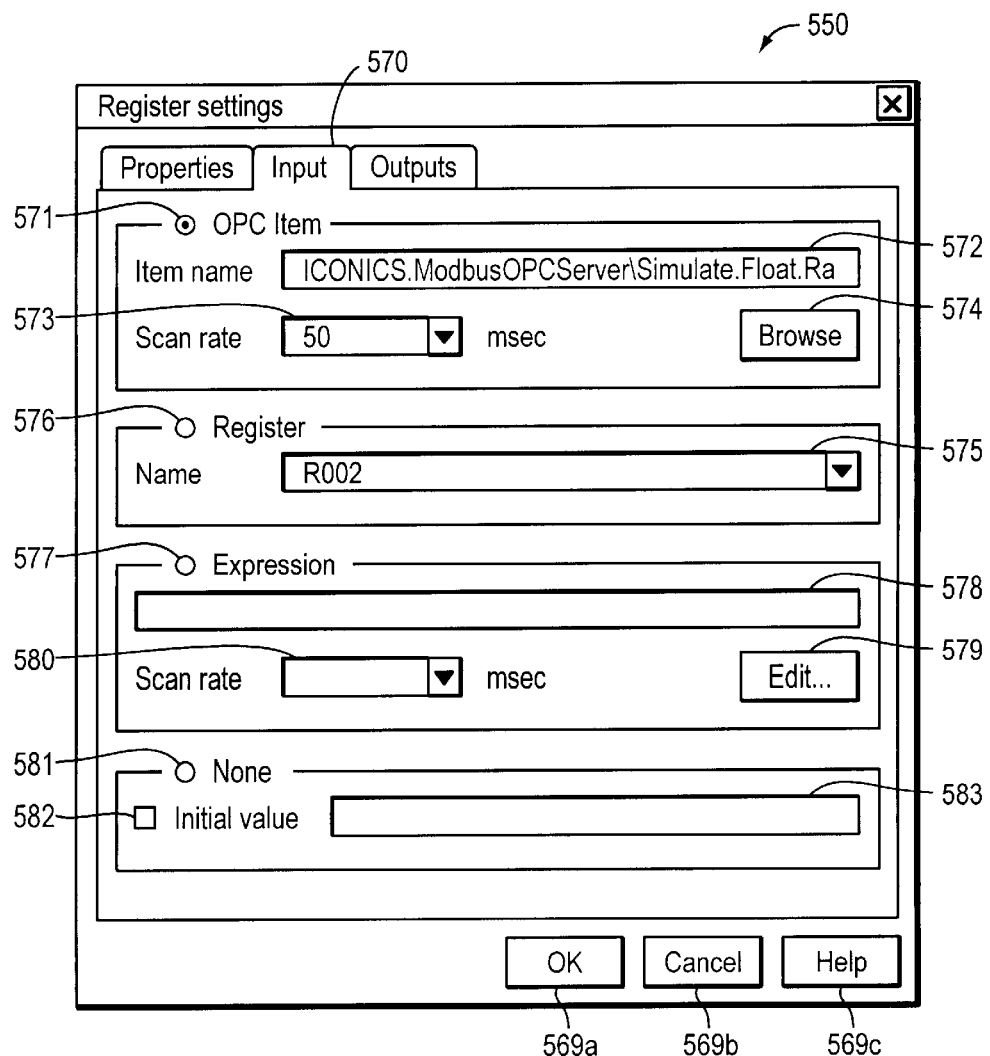
FIG. 10 depicts an example of the configuration of input parameters in a data bridging application, according to the invention.

FIG. 10 depicts an example of the configuration of input parameters in a data bridging application according to the invention. FIG. 10 shows an embodiment comprising an interactive display 550, known to those of ordinary skill in the art as a dialog box, through which the user provides the DataWorX32 program information about an input connected to a register. The user first selects the Input tab 570 that activates the dialog box shown. The elements of the dialog box that the user can control include radio button 571 labeled OPC Item, which if activated declares the input to be an OPC item. The Input name is entered in box 572 as a tag name comprising alphanumeric symbols. The user defines a scan rate in milliseconds by entering a numeric value in box 573. The scan rate is the repeat period that the register polls the input for new information. When activated, the Browse button 574 causes the OPC Universal Tag Browser to appear. The OPC Universal Tag Browser is discussed below and depicted in FIG. 12.

The user can enter a register name in box 575 upon activation of radio button 576, labeled Register. If the Register radio button 576 is active, a drop-down list of all the register names defined in DataWorX32 can be displayed for the convenience of the user upon activation of the button marked with a down arrowhead. Activation of Radio button 577, labeled Expression, allows the entry of an expression in the box 578. If Radio button 577 is activated, the button labeled Edit 57 activates an Edit Expression dialog box, which permits an expression to be edited. Activation of radio button 577 also activates scan rate entry box 580 that behaves as discussed earlier with regard to box 573.

The user can also activate Radio button 581, labeled None, that indicates to the DataWorX32 program that the selected register has no inputs. In this case the register may have a defined initial value, if the user activates check box 582 and enters a value in box 583. An OPC client may also write to a register that has no defined input. The user finishes entering data by activating the button 569a labeled OK, or cancels an entry in its entirety by activating the button 569b labeled Cancel. If the user needs help, he or she can activate the button 569c labeled Help at any time.

Figure 11:
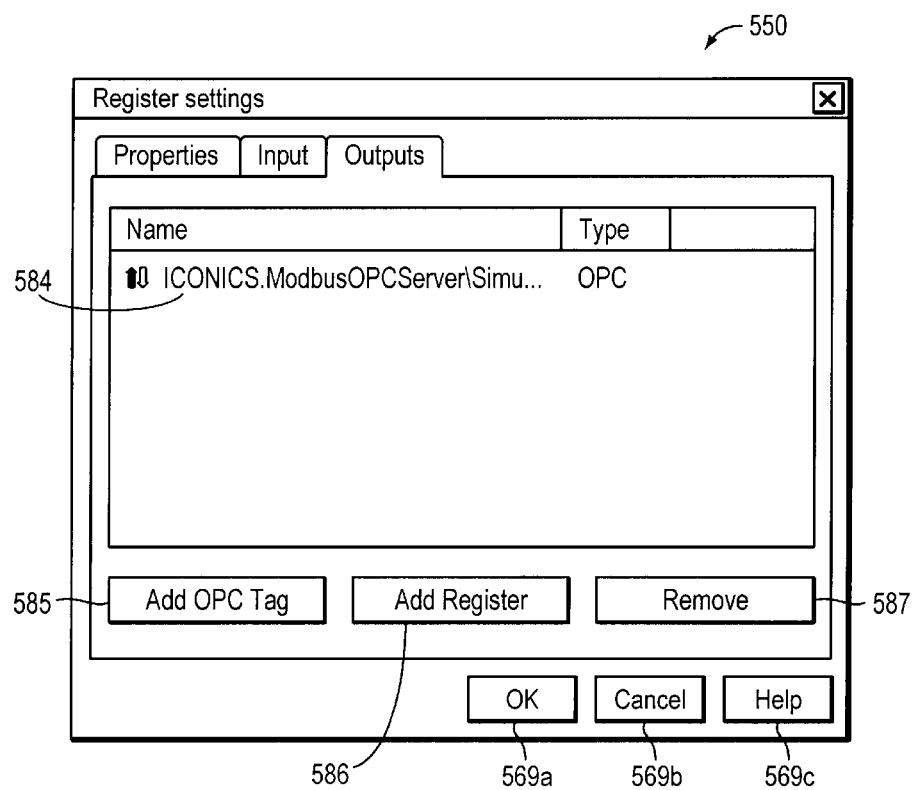
FIG. 11 depicts an example of the configuration of a data bridging application according to the invention, in which an output is being selected and configured.
Figure 13:
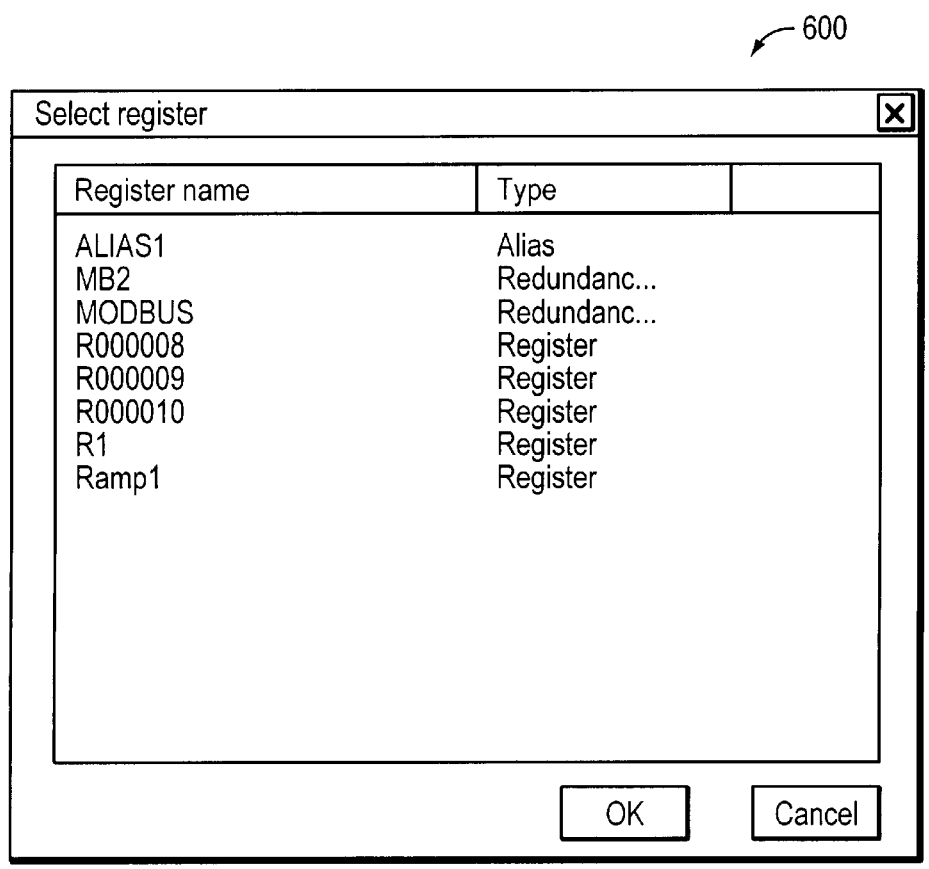
FIG. 13 depicts an embodiment of the present invention, in which a list of registers may be examined.

FIG. 11 depicts an example of the configuration of an output in a data bridging application, according to the invention. FIG. 11 shows an embodiment comprising an interactive display 550, also known as a dialog box, through which the user provides the DataWorX32 program information about one or more outputs that are connected to a register. The user selects the tab 588 labeled Outputs to activate this dialog box 550. A name of an OPC Tag or a Register 584 is displayed in the dialog box 550. The name is designated as either an OPC Register or a Tag by the entry in the column headed Type. If the user activates the button 585 labeled Add OPC Tag, the OPC Tag Browser is displayed. The OPC Tag Browser is discussed below and depicted in FIG. 12. The user can activate the button 586 labeled Add Register activates the Select Register dialog box. The Select Register dialog box is discussed below and is depicted in FIG. 13. The Select Register dialog box allows the user to add a Register to the list of Registers that take values as outputs from the Register that is being configured. The button 587 labeled Remove allows the user to remove an output from the list of outputs. The user finishes entering data by activating the button 569*a* labeled OK, or cancels an entry in its entirety by activating the button 569*b* labeled Cancel. If the user needs help, he or she can activate the button 569*c* labeled Help at any time.

FIG. 12 depicts an embodiment of the present invention, in which a list of tags may be examined. FIG. 12 shows an embodiment comprising an interactive display called the OPC Tag Browser 590, also known as a dialog box, through which the user communicates with the DataWorX32 program to review information about one or more OPC Tags. In the left pane 591 of the OPC Tag Browser 590 there is presented a tree structure showing the various directories and sub-directories of the computer file system, of which a subdirectory names Simulate happens to be selected. The right pane 592 of the OPC Tag Browser 590 shows a list of the available Tag names in the selected sub-directory, according to the entry of a filter in box 594. In this instance, the filter 594 is the asterisk, or wildcard, that allows the display of any entry that is present. The identifier of the Tag is displayed in the box 595 labeled Item Id. The OPC Tag Browser 590 allows the user to find and select any of the Tags available in the system. Upon completing the selection process, the user can activate the button 596*a* labeled OK, or can cancel the selection by activating the button 596*b* labeled Cancel. The user can obtain a current list of OPC Tags by activating the Refresh button 596*c*.

FIG. 13 depicts an embodiment of the present invention, in which a list of registers may be examined. FIG. 13 shows an embodiment comprising an interactive display called Select Register 600, which is a dialog box, through which the user communicates with the DataWorX32 program to review and/or modify information about one or more Registers, Aliases, and redundant servers. The Select Register dialog box 600 has a single pane that lists all of the Registers, Aliases, and redundant servers that are defined in the DataWorX32 program. To edit a Register, one selects a displayed Register name and activates the Edit option of the Registers menu of the DataWorX32 user screen 400. One then modifies the entries under the Properties, Input and Output Tabs discussed above, and accepts the modified entries.

Figure 14:
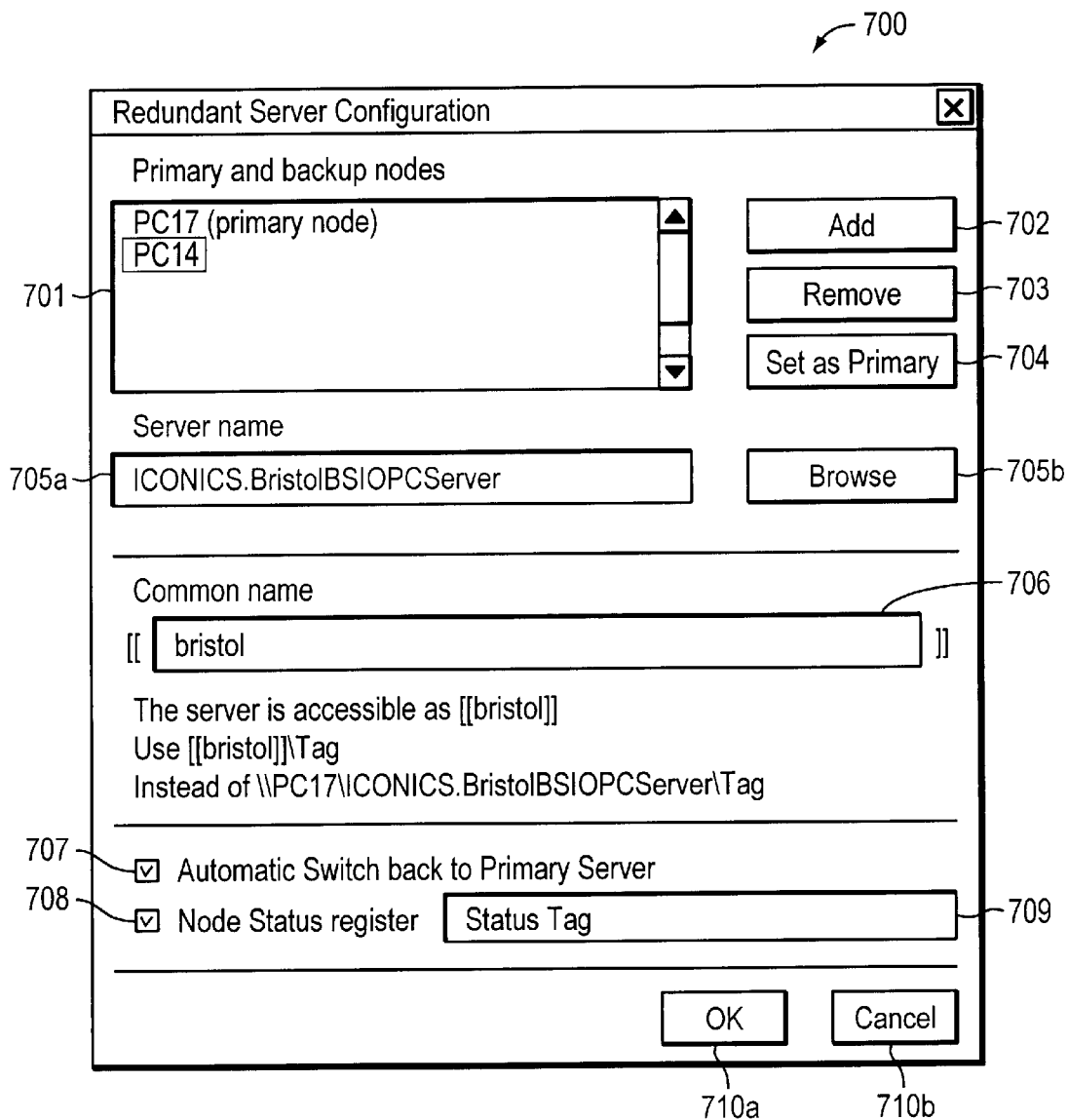
FIG. 14 depicts an example of the configuration of a redundancy application according to the invention, in which a primary controlling machine and a plurality of secondary controlling machines are being enumerated.

FIG. 14 depicts an example of the configuration of a redundancy application according to the invention, in which a primary controlling machine and a plurality of secondary controlling machines are being enumerated. FIG. 14 shows an embodiment comprising an interactive display 700 called the Redundant Server Configuration. In the pane 701 labeled Primary and backup nodes are listed two servers or computers, named PC17 and PC14. One computer must be the primary controlling machine, which in the present example is PC17, identified as "(primary node)." One or more computers can be designated as secondary controlling machines, or redundant or "Backup" servers. If more than one secondary controlling machine is specified, the machines must be specified in an order that each will be called upon if the primary controlling machine is unavailable. The DataWorX32 program can thus direct the flow of instructions and information to a secondary controlling machine if the primary controlling machine is unavailable, making the operation of the system transparent to the computers connected to the network. The secondary controlling machines are given control of the network in the order of their designation in the configuration. The selection of primary and secondary controlling machines, or primary and backup nodes, is accomplished in conjunction with the Select Network Node dialog box depicted in FIG. 15, which is activated by selecting the Add button 702.

Figure 15:
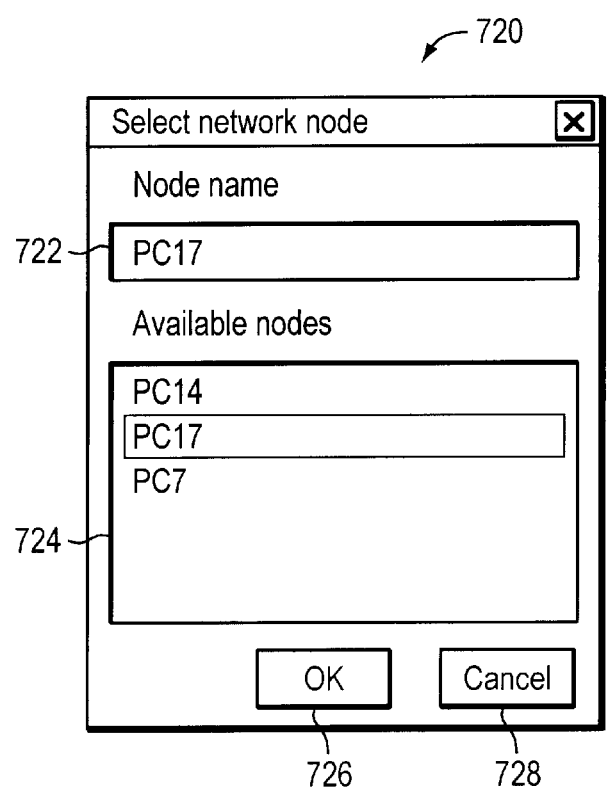
FIG. 15 depicts an embodiment of the present invention in which computers are selected as primary controlling machine and as one or more secondary controlling machines.

FIG. 15 depicts an embodiment of the present invention in which computers are selected as primary controlling machine and as one or more secondary controlling machines. In the embodiment shown in FIG. 15, there is a dialog box 720 called the Select Network Node dialog box. A node can be identified in the Node name box 722. A pane 724 labeled Available nodes lists the nodes that the network has as available nodes. The use can highlight a node by using a pointing device, such as a mouse, arrow keys on a computer keyboard or by typing in a designator, and accept the selection by activating the button 726 labeled OK. The user can also cancel the operation by activating the button 728 labeled Cancel.

Returning to FIG. 14, after the user has selected a node, the node will have been added. A node can be removed by activating the Remove button 703. The user can identify a node to the DataWorX32 program by highlighting the node identifier and activating the Set as Primary button 704. The name of the server, or computer, or node, is displayed as the primary node in the pane 701, and its name is displayed in the box 705*a* labeled Server name. Alternatively the user can select the Browse button 705*b* that activates the Select OPC Server dialog box discussed below and depicted in FIG. 16. Some computers may be given common names in a network. Such common names can be displayed in the Common name box 706. The common name enclosed within two sets of square brackets can be used as an alias, as in the name "[[bristol]]" as depicted in FIG. 14.

Figure 16:
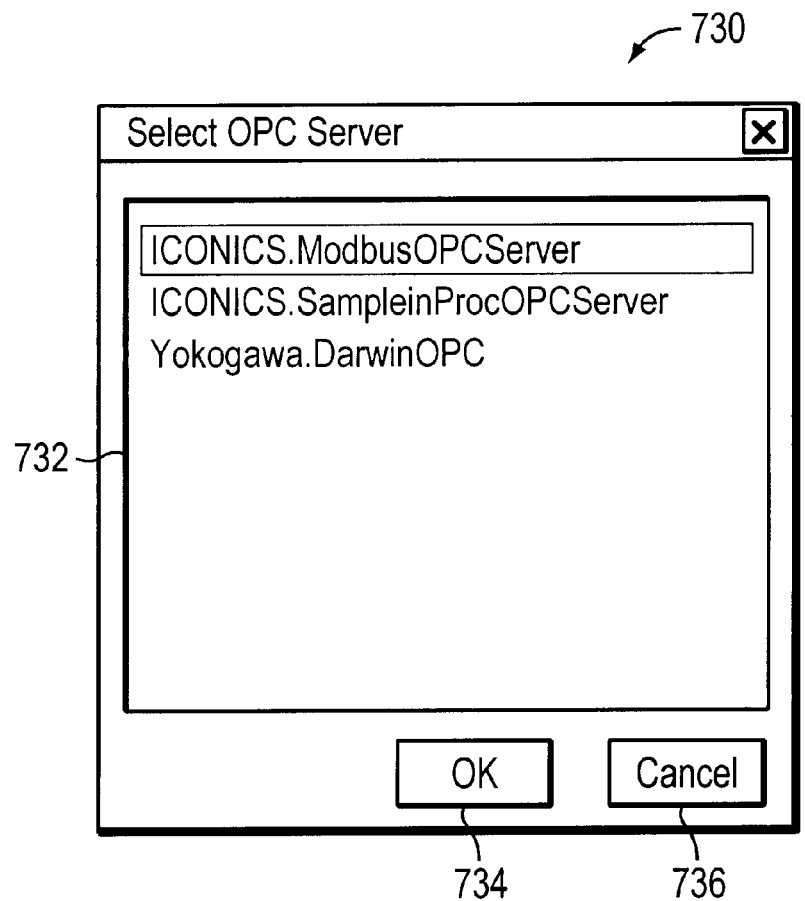
FIG. 16 depicts an embodiment of the present invention in which computers are identified as servers.

FIG. 16 depicts an embodiment of the present invention in which computers are identified as servers. FIG. 16 shows a user dialog box 730 that is called Select OPC Server. This dialog box lists all the available servers in a pane 732, in which the user can highlight a name of a server using a pointing device, such as a mouse or arrow keys. Upon completing the selection, the user can confirm the selection by activating the OK button 734, or the user can reject the selection by activating the Cancel button 736.

Returning to FIG. 14, the user can designate whether the primary controlling machine is intended to regain control of the network after it returns to availability by checking the Automatic Switch back to Primary Server box 707. The user can designate whether a flag will be set when the primary controlling machine is off-line by checking the Node Status register box 708, and can designate a name for the flag in the dialog box 709. Upon completing the selection process, the user can accept the selection by activating the OK button 710*a* or can reject the selection by activating the Cancel button 710*b*. The Redundant Server Configuration dialog box 700 can be used to edit a Redundant node by accessing it via the Edit item under the Redundancy menu of the DataWorX32 user screen 400.

Figure 17:
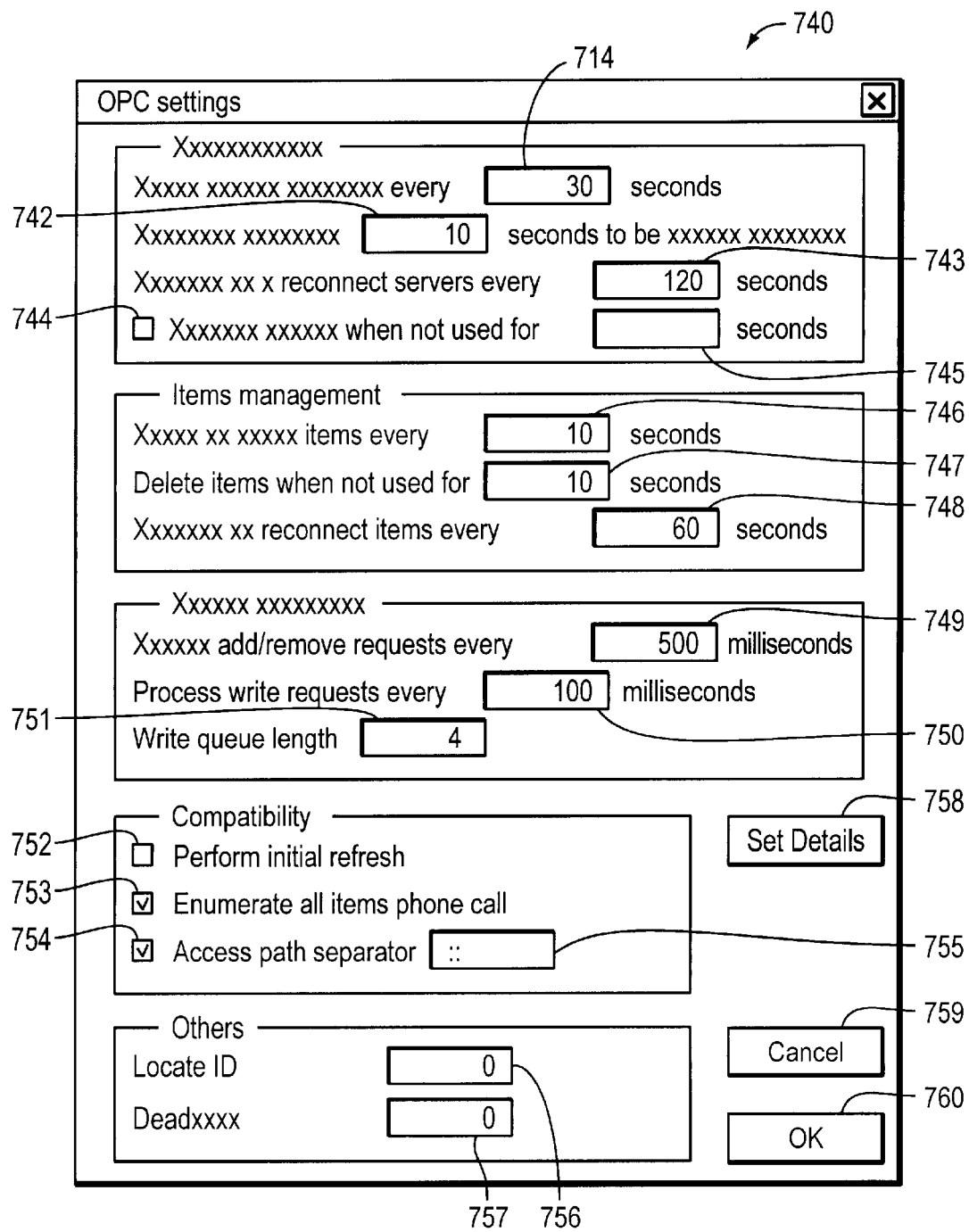
FIG. 17 depicts an embodiment of the present invention in which OPC settings may be selected.

FIG. 17 depicts an embodiment of the present invention in which OPC settings may be selected. FIG. 17 shows an embodiment comprising an OPC Settings dialog box 740. The OPC Settings dialog box 700 can be accessed by selecting the OPC Setting item under the Tools menu of the DataWorX32 user screen 400. This is a sophisticated capability that allows the user to designate some of the parameters of operation of the system according to the OPC communication standard.

The OPC Settings dialog box 740 allows the user to set a period in seconds for checking whether the servers or computers are alive. The user can enter a numeric value in the box 741 to set this value. The user can additionally set a response time in seconds in the box 742, which defines an interval within which a server or computer must respond to be considered alive. The user can additionally set a time period in seconds by making a numeric entry in the box 743 for reattempting to gain a response form a computer that has failed to respond, either because the connection is lost, or because the response appears to be corrupted in some manner. In addition, in order to save communication bandwidth, a user can activate a checkbox 744 that indicates that a connection to an unused server should be shut down after a specific time of disuse, with the time in seconds entered by the user in the box 745, if the user has checked the box 744.

The user can also indicate that certain maintenance functions should be performed on a desired schedule. The user can designate a time in seconds for cleaning up items by entering a numerical value in the box 746. The user can designate a time in seconds for deleting up items by entering a numerical value in the box 747. The user can designate a time in seconds for attempting a reconnection by entering a numerical value in the box 748.

The user can designate a time in milliseconds for adding or removing requests by entering a numerical value in the box 749. The user can designate a time in milliseconds for writing requests by entering a numerical value in the box 750. The user can designate the length of a write queue by entering a numerical value in the box 751.

Under the OPC specification, servers are supposed to send initial values automatically. If the user checks the Perform initial refresh box 752, the system is forced to make the server send initial values. The user can make check the Enumerate all items in one call box 753 to require a server to send all values in a single transmission to improve performance. However, some servers may not be able to send more than one item at a time, and this option may created difficulties with such servers. The user can select an Access path separator by checking the box 754 and entering a symbol or string in the box 755.

The user can designate a parameter for identifying a computer in a local group by entering a value in the Locale ID box 756. The user can specify a Deadband width in percent by entering a numerical value in percent in the box 757. The user can return all the parameters described above to their original settings provided in the software by activating the Set Defaults button 758. The user can cancel any changes in parameters that may have been entered by activating the Cancel button 759. The user can accept his or her changes in the foregoing parameters by activating the OK button 760.

Figure 18:
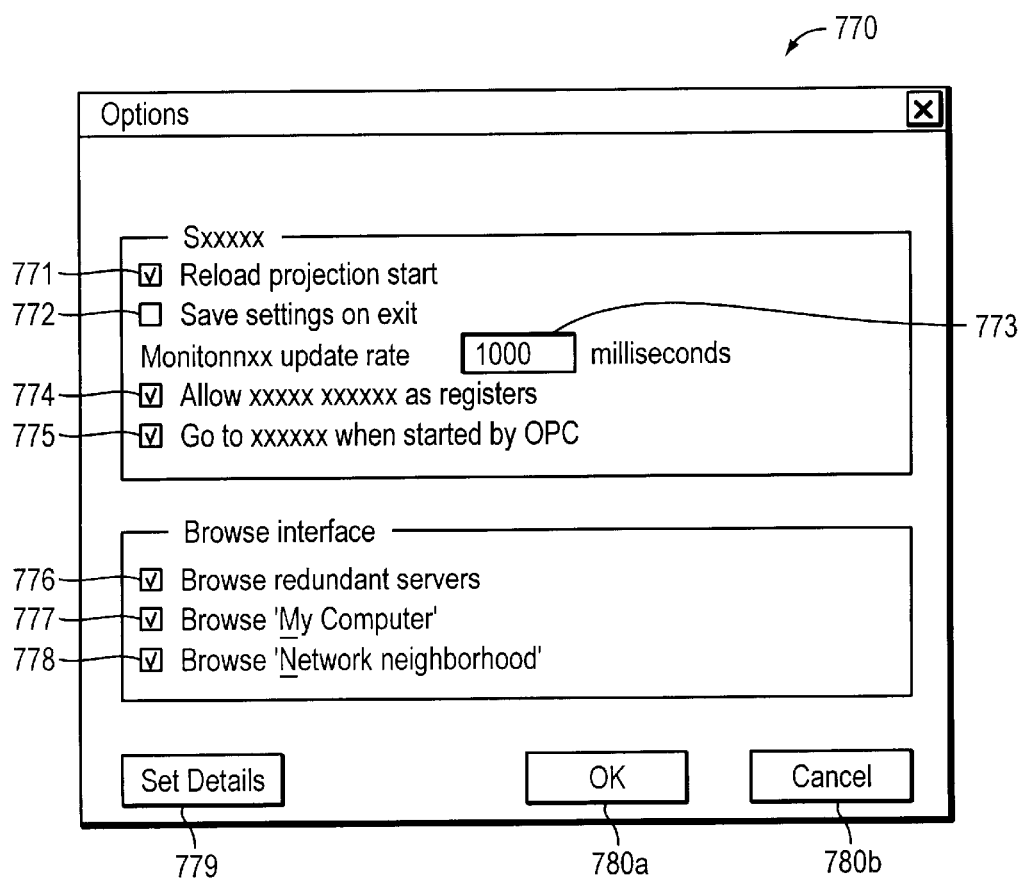
FIG. 18 depicts an embodiment of the present invention in which optional features are selected.

FIG. 18 depicts an embodiment of the present invention in which optional features are selected. FIG. 18 shows an embodiment comprising an Options dialog box 770. The user can activate the Options dialog box 770 by selecting the Options item of the Tool menu of the DataWorX32 user screen 400. The user can designate whether the most recently run project file will be reloaded on starting the DataWorX32 program by checking the Reload project on start box 771. The user can require the DataWorX32 program to save the then current setting on exit by checking the box Save settings on exit 772. The user can define an update rate by entering a numerical value that will be interpreted in milliseconds in box 773. The user can permit the editing of aliases as Registers in Configuration mode by checking the Allow editing aliases as registers box 774. The user can accept the feature of allowing the program to go to Runtime when started by the OPC server by checking the box 775.

The user can control features of the browse interface. The user can allow the display of redundant servers in the Redundancy menu by checking the box 776. The user can allow examine the file system of the local computer through DataWorX32 by checking the Browse 'My Computer' box 777. The user can allow examine the other nodes in the system of the local computer through DataWorX32 by checking the Browse 'Network Neighborhood' box 778.

The user can return the parameters of the Options menu to the original settings by activating the Set Defaults button 779. The user can accept changes to the options parameters by activating the OK button 780a or can reject all of the changes by activating the Cancel button 780b.

Figure 19:
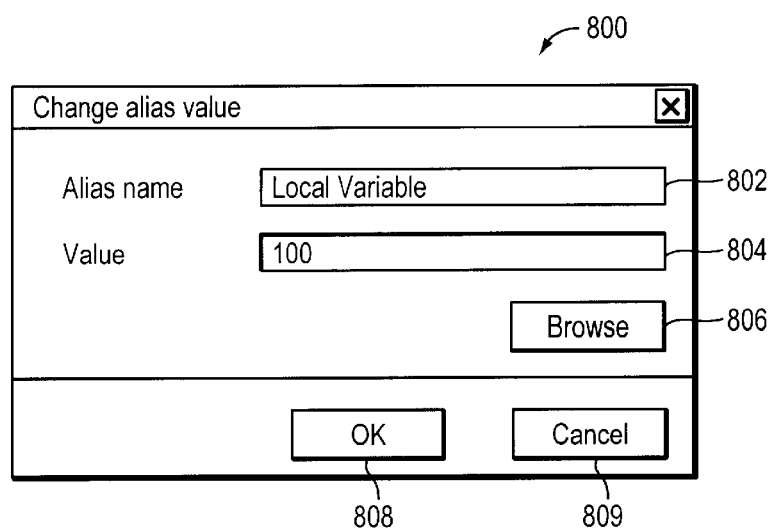
FIG. 19 depicts an embodiment in which the value of an alias is changed, according to the invention.
Figure 20:
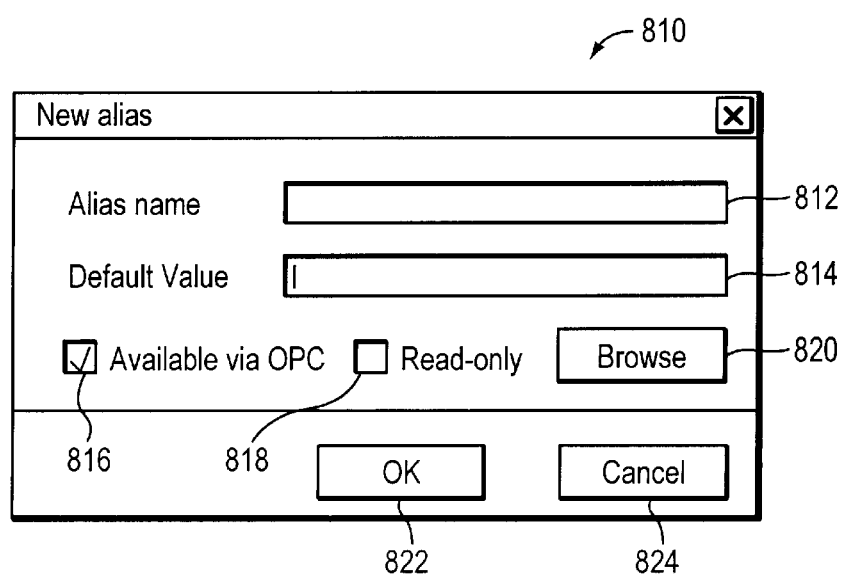
FIG. 20 depicts an embodiment in which a new alias is created, according to the invention.
Figure 21:
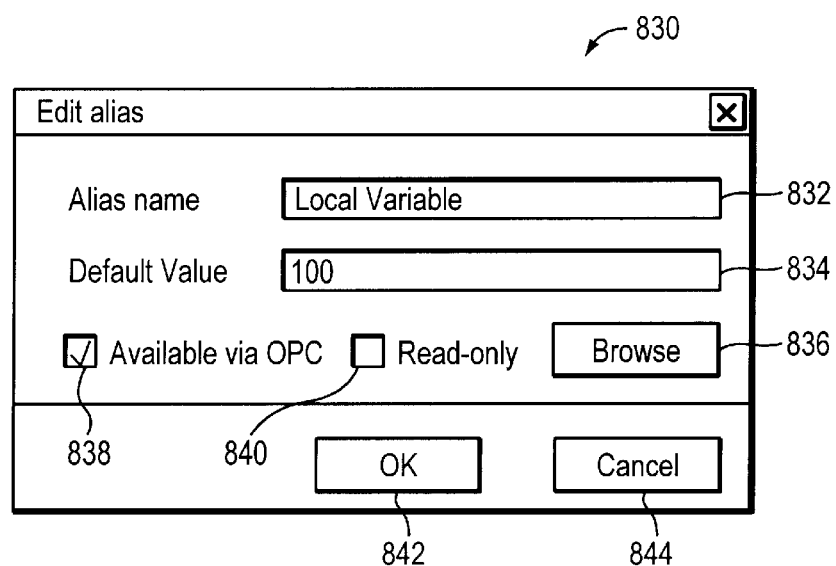
FIG. 21 depicts an embodiment in which an alias is edited, according to the invention.

Aliases are more fully discussed and described in conjunction with FIGS. 19 through 21. FIG. 19 depicts an embodiment in which the value of an alias is changed, according to the invention. To change an alias value, the user selects an alias from the Alias Names column of the Alias editor, which is described below and depicted in FIG. 21. The user then selects the Change Value item under the Aliases menu of the DataWorX32 user screen 400. The Change alias value dialog box 800 shown in FIG. 19 appears. The name of the selected alias appears in the box 802. The user can enter a new value for the alias in the Value box 804. If the user activates the Browse button 806, the OPC Tag Browser described above is activated, and the user can select a Tag as a value for the alias. The user can then accept the new value by activating the OK box 808, or the user can reject the new value by activating the Cancel box 809.

FIG. 20 depicts an embodiment in which a new alias is created, according to the invention. The user can create a new alias. The user can activate this feature by selecting the Add item of the Alias menu of the DataWorX32 user screen 400. FIG. 20 shows an embodiment of a New alias dialog box 810. The user can enter a name, which can be a tag name, for a new alias in the box 812. The user can enter a default value for the alias in the box 814. If the user checks the box 816, the new alias will be available via OPC. The user can make the alias a read-only alias by checking the box 818. The user can search for tags by activating the Browse button 820, which will cause the OPC Tag Browser to become active. The user can then accept the parameters entered by activating the OK button 822, or can reject the selections made by activating the Cancel button 824.

The user can edit an alias. FIG. 21 depicts an embodiment in which an alias is edited, according to the invention. FIG. 21 shows an embodiment comprising an Edit alias dialog box 830. The user can activate this dialog box 830 by selecting an alias name in the upper pane of DataWorX32 user screen 400, and then selecting the Edit alias item under the Aliases menu of the DataWorX32 user screen 400. The user can enter an alias name in the box 832, or the user can locate an alias name by activating the browse button 834 to display the OPC Tag Browser. The user can also enter a default value in the box 836. If the user checks the box 838, the new alias will be available via OPC. The user can make the alias a read-only alias by checking the box 840. The user can then accept the parameters entered by activating the OK button 842, or can reject the selections made by activating the Cancel button 844.

Figure 22:
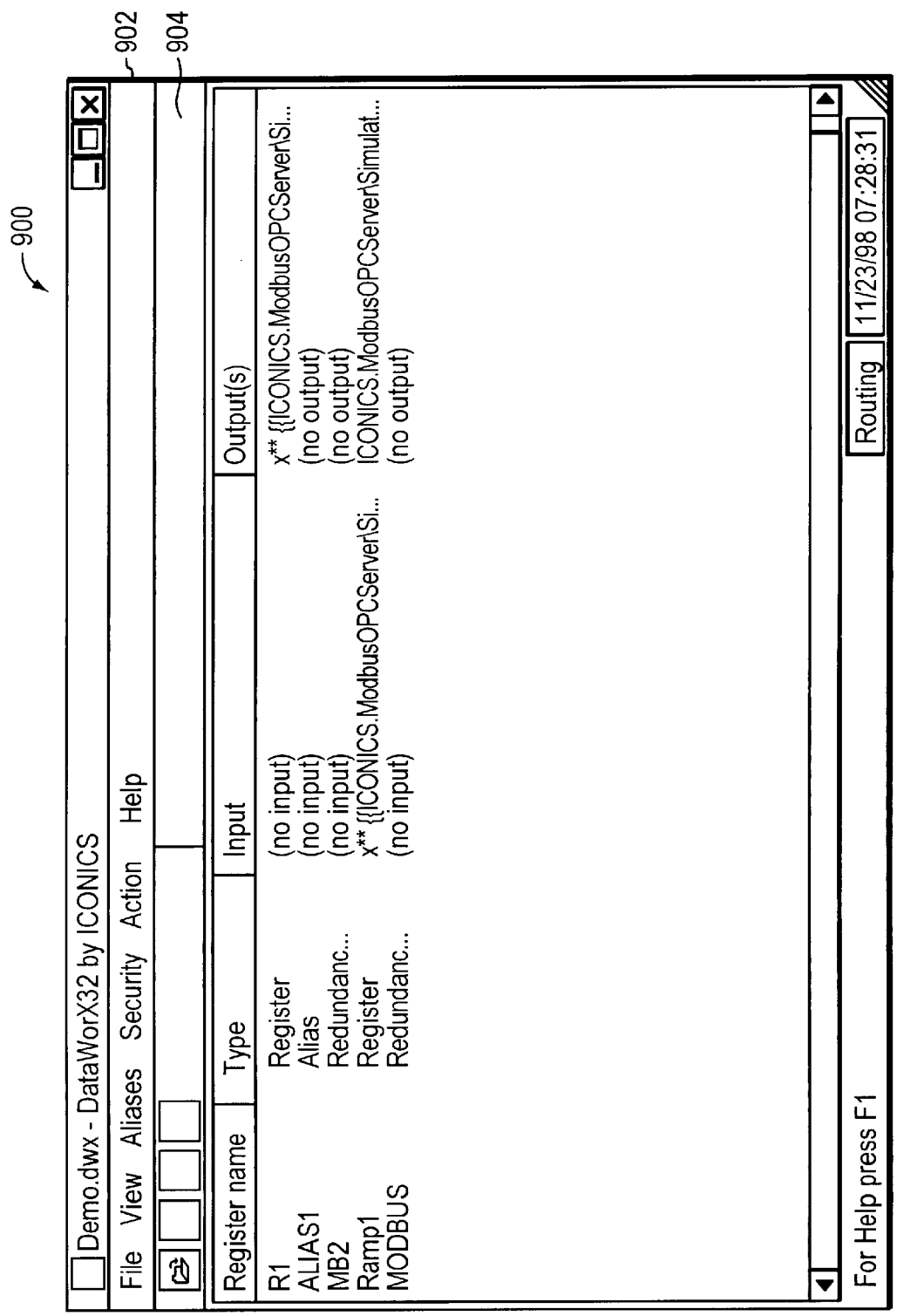
FIG. 22 depicts an embodiment of the screen that provides information about the system during its operation, according to the invention.

Once the system has been configured, which in one embodiment is accomplished by configuring the Data-WorX32 program, the system is ready for operation. In order to operate the system, it is necessary to issue an appropriate command for the software to begin operation. In the embodiment presently under discussion, the user can select the command Start DataWorX32 that appears under the Action menu of the DataWorX32 user screen 400. Once the Data-WorX32 program has started to run, the Runtime Screen 900 shown in FIG. 22 appears. FIG. 22 depicts an embodiment of the screen that provides information about the system during its operation, according to the invention. Comparison of this Runtime screen 900 with the DataWorX32 user screen 400 shows that there are several fewer entries in the Runtime screen menubar 902 and several fewer icons in the Runtime screen 900 toolbar 904 as compared to the Data-WorX32 user screen 400 menubar 402 and toolbar 404. In particular, the menu entries Register, Redundancy, and Tools are not present in the Runtime screen 900 menubar 902. The entry Security is present in the Runtime menubar 902, and such an entry is absent from the DataWorX32 user screen 400 menubar 402. The upper pane 906 of the Runtime screen 900 is shown in FIG. 22, while the lower pane is not shown. The upper pane 906 of the Runtime screen 900 displays live data for the various Registers, Aliases and Redundant servers or controlling machines. The lower pane that is not shown displays various status messages that describe the status of the DataWorX32 program. In the present embodiment, the Security menu provides options for the user to define a security configuration in Runtime, so that certain nodes can be designated as accessible only by certain individuals and/or under certain conditions. There are many well known reasons for providing security both with respect to who may access a system and which nodes of a system may be amenable to access. As examples, one may wish to deny access to all but specified persons if the system under control poses the possibility of reaching dangerous conditions, or contains proprietary information. One may wish to control access to certain machines that are very sensitive to operating parameters, so that an operator who does not have the requisite knowledge or experience cannot upset the operating conditions by entering erroneous control parameters. One may wish to limit human interaction with control parameters that are numerous, and that vary rapidly in time, because a human cannot control so many variables in such a short time period with any expectation of accuracy. Many other good reasons to limit access to the entry points in an industrial control system will be apparent to one of ordinary skill in the art. The present invention provides for such limitations on access to the control system that can be invoked by a user with sufficient authority.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A computer program recorded on a computer-readable medium, said computer program comprising:
    a) a first module that permits the communication of information according to OLE ("Object Linking and Embedding") for Process Control ("OPC") between a first computer communicating with a first piece of process control equipment and a second computer communicating with a second piece of process control equipment;
    b) a second module that permits:
        a primary controlling machine:
            (i) to communicate according to OPC with the first computer; and
            (ii) to communicate according to OPC with the second computer; and a secondary controlling machine to communicate according to OPC with the first and second computers m place of the primary controlling machine; and
    c) a third module that:
        (i) aggregates all requests for the same information directed to one of a plurality of interconnected computers, the plurality including the first and the second computers, the one computer communicating with at least one piece of process control equipment, the requests transmitted according to OPC;
        (ii) communicates with the one computer according to OPC and obtains the information;
        (iii) delivers according to OPC the requested information.

2. The computer program of claim 1, wherein the requested information comprises a process control parameter.

3. The computer program of claim 1, wherein the secondary controlling machine automatically comnunicates with the first and second computers in place of the primary controlling machine when the primary controlling machine becomes unavailable.

4. A networked computerized communication and control system, comprising;
    a) a primary controlling machine of the system;
    b) a plurality of interconnected computers, each computer connected via a network to the primary controlling machine, at least some of the computers each communicating with at least one of piece of process control equipment;
    c) a first module that pennits communication of information according to OLE ("Object Linking and Embedding") for Process Control ("OPC") between a first computer of the plurality of computers and a second computer of the plurality of computers;
    d) a second module that;
        permits the primary controlling machine;
            (i) to communicate according to OPC wit the first computer; and
            (ii) to communicate according to OPC with the second computer; and
        permits a secondary controlling machine of the system to communicate according to OPC with the first and second computers in place of the primary controlling machine; and
    e) a third module that:
        (i) aggregates all requests for the same information directed to one of the plurality of interconnected computers, the one computer communicating with at least one piece of process control equipment, the requests transmitted according to OPC;
        (ii) communicates with the one computer according to OPC and obtains the information;
        (iii) delivers according to OPC the requested information.

5. The networked computerized communication and control system of claim 4, wherein the requested information comprises a process control parameter.

6. A method of communicating between and controlling equipment connected via a computerized communication and control network, comprising the steps of:

a) providing a primary controlling machine;

b) providing a plurality of interconnected computers, each computer connected via the network to the controlling machine, at least some of the computers each communicating with at least one piece of process control equipment;

c) providing a first module that permits communication of information according to OLE ("Object Linking and Embedding") for Process Control ("OPC") between a first computer of the plurality of computers and a second computer of the plurality of computers;

d) providing a second module that:

permits the primary controlling machine:

(i) to communicate according to OPC with the first computer; and (ii) to communicate according to OPC with the second computer; and permits a secondary controlling machine to communicate according to OPC with the first and second computers in place of the primary controlling machine;

e) providing a third module that:

(i) aggregates all requests for the same information directed to one of the plurality of interconnected computers, the one computer communicating with at least one piece of process control equipment, the requests transmitted according to OPC;

(ii) communicates with the one computer according to OPC and obtains the information;

(iii) delivers according to OPC the requested information;

f) operating the first module, the second module and the third module to communicate information according to OPC between at least some of the plurality of computers that are communicating with pieces of process control equipment so as to control a process.

7. The method of claim 6, wherein the reciuested information comprises a process control parameter.

8. The method of claim 6, wherein the secondary controlling machine automatically communicates with the first and second computers in place of the primary controlling machine when the primary controlling machine becomes unavailable.

9. The computer program of claim 1 wherein all requests for information originate from one computer.

10. The networked computerized communication and control system of claim 4 wherein all requests for information originate from one computer.

11. The method of claim 6 wherein all requests for information originate from one computer.

* * * * *